US010141027B2

United States Patent
Lee et al.

(10) Patent No.: US 10,141,027 B2
(45) Date of Patent: Nov. 27, 2018

(54) METHOD, STORAGE MEDIUM, AND ELECTRONIC DEVICE FOR PROVIDING PLURALITY OF IMAGES

(71) Applicant: Samsung Electronics Co., Ltd, Gyeonggi-do (KR)

(72) Inventors: Woo-Yong Lee, Gyeonggi-do (KR); Hye-Jin Kang, Gyeonggi-do (KR); Min-Sheok Choi, Gyeonggi-do (KR); Ki-Huk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/436,733

(22) Filed: Feb. 17, 2017

(65) Prior Publication Data

US 2017/0243617 A1 Aug. 24, 2017

(30) Foreign Application Priority Data

Feb. 19, 2016 (KR) ........................ 10-2016-0020028

(51) Int. Cl.
*H04N 9/80* (2006.01)
*G11B 27/34* (2006.01)
*G06K 9/00* (2006.01)
*G11B 27/031* (2006.01)

(52) U.S. Cl.
CPC .......... *G11B 27/34* (2013.01); *G06K 9/00758* (2013.01); *G11B 27/031* (2013.01); *G06K 2009/00738* (2013.01)

(58) Field of Classification Search
USPC ....... 386/241, 239, 326, 328, 323, 330, 341, 386/296
See application file for complete search history.

(56) References Cited

U.S. PATENT DOCUMENTS

| 5,623,344 A * | 4/1997 | Lane .................. G11B 15/1875 348/E5.007 |
| 8,150,233 B2 * | 4/2012 | Takao .................... G11B 27/28 386/239 |
| 8,264,934 B2 | 9/2012 | Waites |
| 2017/0111594 A1 * | 4/2017 | Ayers .................. H04N 5/2624 |

FOREIGN PATENT DOCUMENTS

| JP | 2011250340 | 12/2011 |
| JP | 2013146025 | 7/2013 |

\* cited by examiner

*Primary Examiner* — Robert Chevalier

(57) ABSTRACT

A method of providing an image by an electronic device may include: acquiring first and second images and sound data; generating event information through analysis of at least one of the first and second images and the sound data; and generating a multitrack file including the first and second images, the sound data, and the event information.

21 Claims, 18 Drawing Sheets

METHOD, STORAGE MEDIUM, AND ELECTRONIC DEVICE FOR PROVIDING PLURALITY OF IMAGES

CROSS-REFERENCE TO RELATED APPLICATION(S) AND CLAIM OF PRIORITY

The present application is related to and claims priority under 35 U.S.C. § 119(a) to Korean Application Ser. No. 10-2016-0020028, which was filed in the Korean Intellectual Property Office on Feb. 19, 2016, the entire content of which is hereby incorporated by reference.

TECHNICAL FIELD

The present disclosure relates to an electronic device and a method of providing an image.

BACKGROUND

The conventional electronic device may include a camera and may take a photograph through the camera at a time point that a user desires.

The conventional electronic device may process an image photographed through the camera, compress the processed image to generate an image file, and store the generated image file in a memory.

SUMMARY

However, in the conventional art, when a video file including a plurality of images (or images of various view points) is generated, a user was required to manually perform editing to display a desired image at a desired time point, which inconvenienced the user.

Accordingly, a method of conveniently generating a video file including a plurality of images and also effectively providing an important image of the plurality of images to the user is required.

To address the above-discussed deficiencies, it is a primary object to provide a method of providing an image by an electronic device. The method includes: acquiring first and second images and sound data; generating event information through analysis of at least one of the first and second images and the sound data; and generating a multitrack file including the first and second images, the sound data, and the event information.

In accordance with another aspect of the present disclosure, an electronic device is provided. The electronic device includes: a memory; and a processor configured to acquire first and second images and sound data, to generate event information through analysis of at least one of the first and second images and the sound data, to generate a multitrack file including the first and second images, the sound data, and the event information, and to store the generated multitrack file in the memory.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
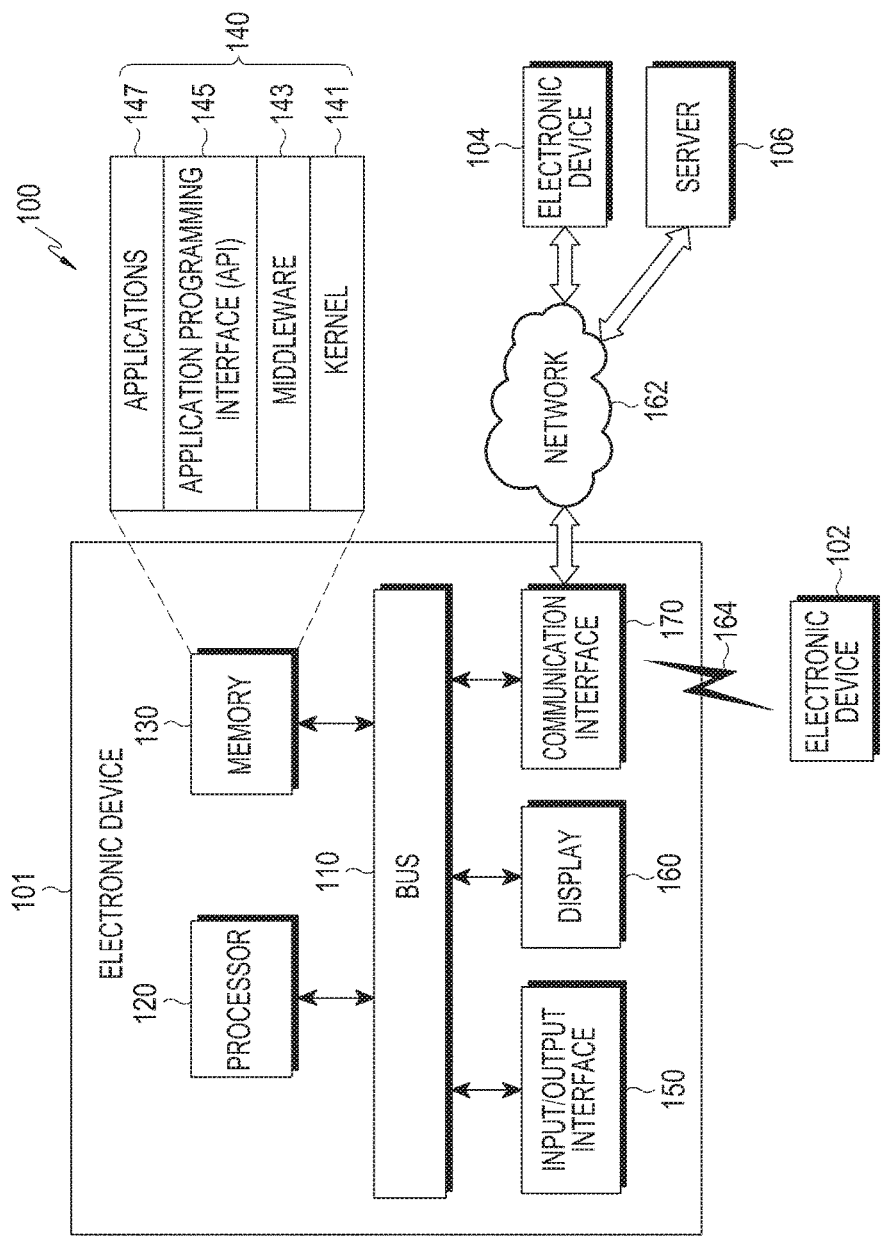
FIG. 1 illustrates an electronic device within a network environment according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. As used herein, singular forms may include plural forms as well unless the context clearly indicates otherwise. As used herein, singular forms may include plural forms as well unless the context clearly indicates otherwise. The expression "a first," "a second," "the first," or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSUNG HOMESYNC™, APPLE TV™, or GOOGLE TV™), a game console (e.g., XBOX™ and PLAYSTATION™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a Global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and/or the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 within a network environment 100 according to various embodiments will be described with reference to FIG. 1 The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include, for example, a circuit that interconnects the elements 110 to 170 and transfers communication (for example, control messages and/or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an operating system (OS). The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof.

For example, the middleware 143 may assign priorities for using the system resources (for example, the bus 110, the processor 120, the memory 130, or the like) of the electronic device 101 to one or more of the application programs 147, and may process the one or more task requests. The API 145 is an interface used by the applications 147 to control a function provided from the kernel 141 or the middleware 143, and may include, for example, at least one interface or function (for example, instruction) for file control, window control, image processing, text control, or the like. For example, the input/output interface 150 may forward instructions or data, which is input from a user or an external device, to the other element(s) of the electronic device 101, or may output instructions or data, which is received from the other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of content (for example, text, images, videos, icons, and/or symbols) for a user. The display 160 may include a touch screen and may receive, for example, a touch, gesture, proximity, or hovering input using an electronic pen or the user's body part. The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, BLUETOOTH, BLUETOOTH low energy (BLE), ZIGBEE, near field communication (NFC), magnetic secure transmission, radio frequency, and body area network (BAN). According to an embodiment, the wireless communication may include a GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), and a plain old telephone service (POTS). The network 162 may include a telecommunications network, for example, at least one of a computer network (for example, a LAN or a WAN), the Internet, and a telephone network.

Each of the first and second external electronic devices 102 and 104 may be of a type identical to, or different from, that of the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may request another device (for example, the electronic device 102 or 104, or the server 106) to perform at least some functions relating thereto instead of, or in addition to, performing the functions or services by itself. The other electronic device (for example, the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

Figure 2:
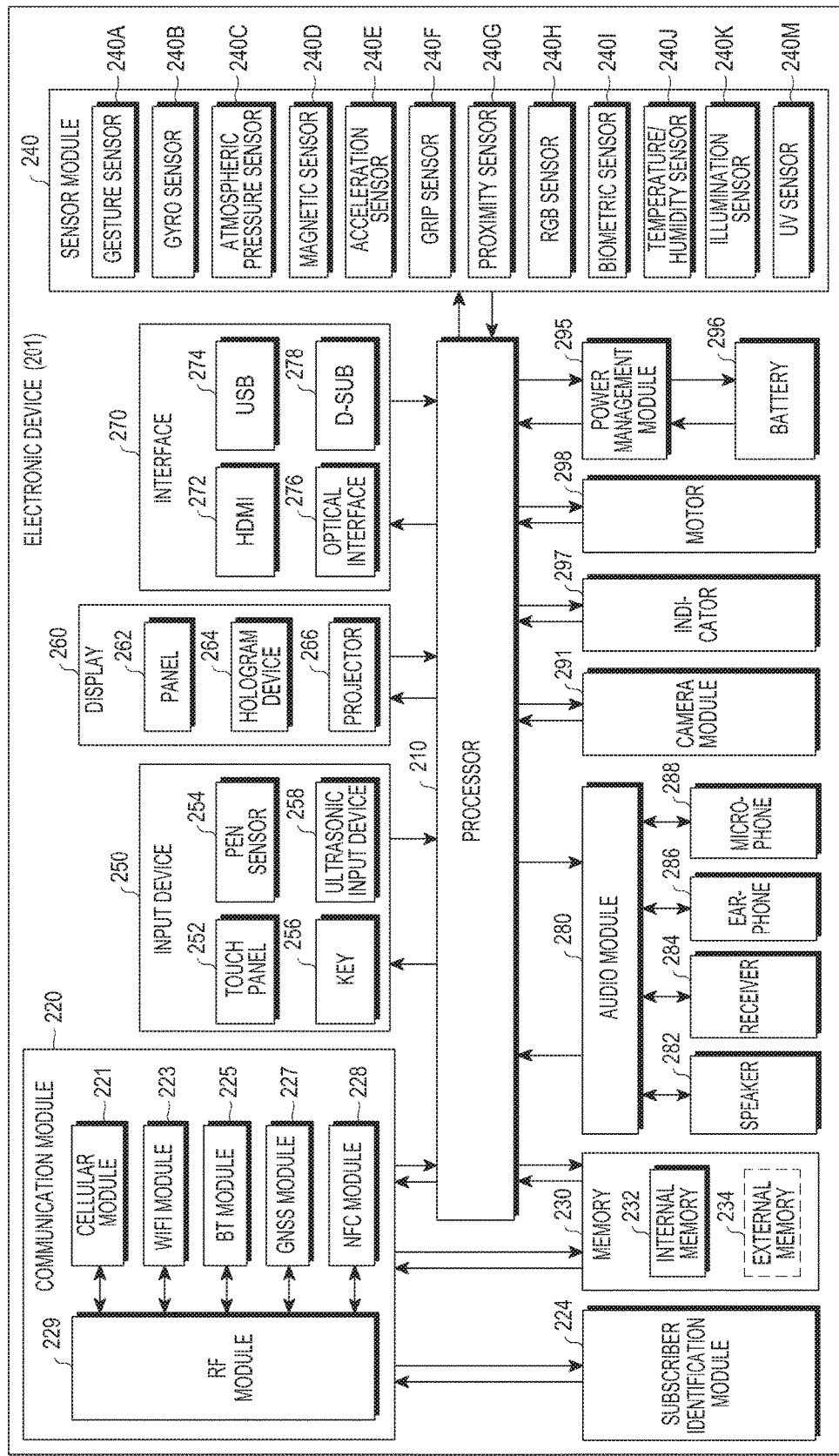
FIG. 2 illustrates a block diagram of the electronic device according to various embodiments of the present disclosure.

FIG. 2 is a block diagram of an electronic device 201 according to various embodiments. The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be embodied, for example, as a system on chip (SoC). According to an embodiment, the processor 210 may further include a graphic processing unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory), process the loaded instructions or data, and store the result data in the non-volatile memory.

The communication module 220 (for example, the communication interface 170) may include, for example, a cellular module 221, a Wi-Fi module 223, a BLUETOOTH module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP). According to some embodiments, at least some (for example, two or more) of the cellular module 221, the Wi-Fi module 223, the BT module 225, the GNSS module 227, and the NFC module 228 may be included in one integrated chip (IC) or IC package. The RF module 229, for example, may transmit or receive a communication signal (for example, an RF signal). The RF module 229 may include, for example, a transceiver, a power amp module (PAM), a frequency filter, a low noise amplifier (LNA), an antenna, or the like. According to another embodiment, at least one of the cellular module 221, the Wi-Fi module 223, the BT module 225, the GNSS module 227, and the NFC module 228 may transmit/receive an RF signal through a separate RF module. The subscriber identification module 224 may include, for example, a card that includes a subscriber identification module, or an embedded SIM, and may contain unique identification information (for example, an integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a one time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a Micro-SD, a Mini-SD, an extreme digital (xD), a multi-media card (MMC), a memory stick, or the like. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor), which may measure a strength of pressure of a user's touch. The pressure sensor may be implemented integratedly with the touch panel 252 or implemented by one or more sensors separated from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280, for example, may convert a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, or the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may have a wired and/or wireless charging method. Examples of the wireless charging method may include a magnetic resonance method, a magnetic induction method, an electromagnetic wave method, or the like. Additional circuits (for example, a coil loop, a resonance circuit, a rectifier, or the like) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate a particular state (for example, a booting state, a message state, a charging state, and the like) of the electronic device 201 or a part (for example, the processor 210) thereof. The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), MEDIAFLO™, or the like. Each of the above-described component elements of hardware according to the present disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
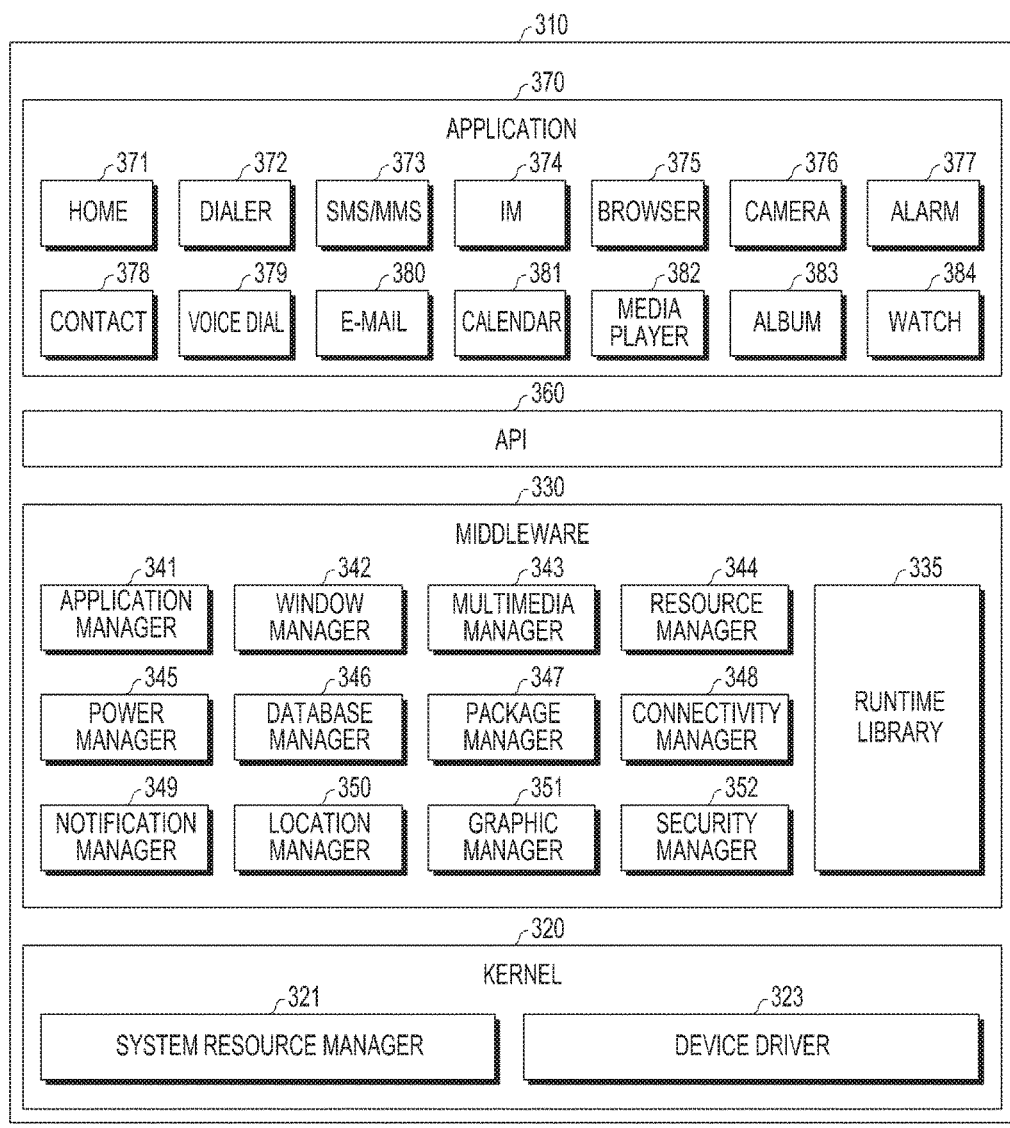
FIG. 3 illustrates a block diagram of a program module according to various embodiments of the present disclosure.

FIG. 3 is a block diagram of a program module according to various embodiments. According to an embodiment, the program module 310 (for example, the program 140) may include an operating system (OS) that controls resources relating to an electronic device (for example, the electronic device 101) and/or various applications (for example, the application programs 147) that are driven on the operating system. The operating system may include, for example, ANDROID™, iOS™, WINDOW™, SYBMIAN™, TIZEN™, or BADA™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 330 may provide a function required by the applications 370 in common, or may provide various functions to the applications 370 through the API 360 to enable the applications 370 to use the limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source codes of the applications 370 or the space of a memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, wireless connection. The notification manager 349 may provide an event (for example, an arrival message, an appointment, a proximity notification, or the like) to a user. The location manager 350 may manage, for example, the location information of the electronic device. The graphic manager 351 may manage, for example, a graphic effect to be provided to a user, or a user interface relating thereto. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. The middleware 330 may dynamically remove some of the existing elements, or may add new elements. The API 360 is, for example, a set of API programming functions, and may be provided with different configurations according to operating systems. For example, in the case of ANDROID or iOS, each platform may be provided with one API set, and in the case of TIZEN, each platform may be provided with two or more API sets.

The applications 370 may include, for example, one or more applications that can perform functions, such as home 371, dialer 372, SMS/MMS 373, instant message (IM) 374, browser 375, camera 376, alarm 377, contacts 378, voice dial 379, e-mail 380, calendar 381, media player 382, album 383, watch 384, health care (for example, measuring exercise quantity or blood glucose), providing of environment information (for example, atmospheric pressure, humidity, or temperature information), and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (for example, turning on/off the external electronic device itself (or some elements thereof) or adjusting the brightness (or resolution) of a display) or applications executed in the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least a part of the program module 310 may be implemented (for example, executed) by software, firmware, hardware (for example, processor 210), or a combination of at least two thereof, and may include a module, a program, a routine, an instruction set, or a process for performing one or more functions.

Figure 4:
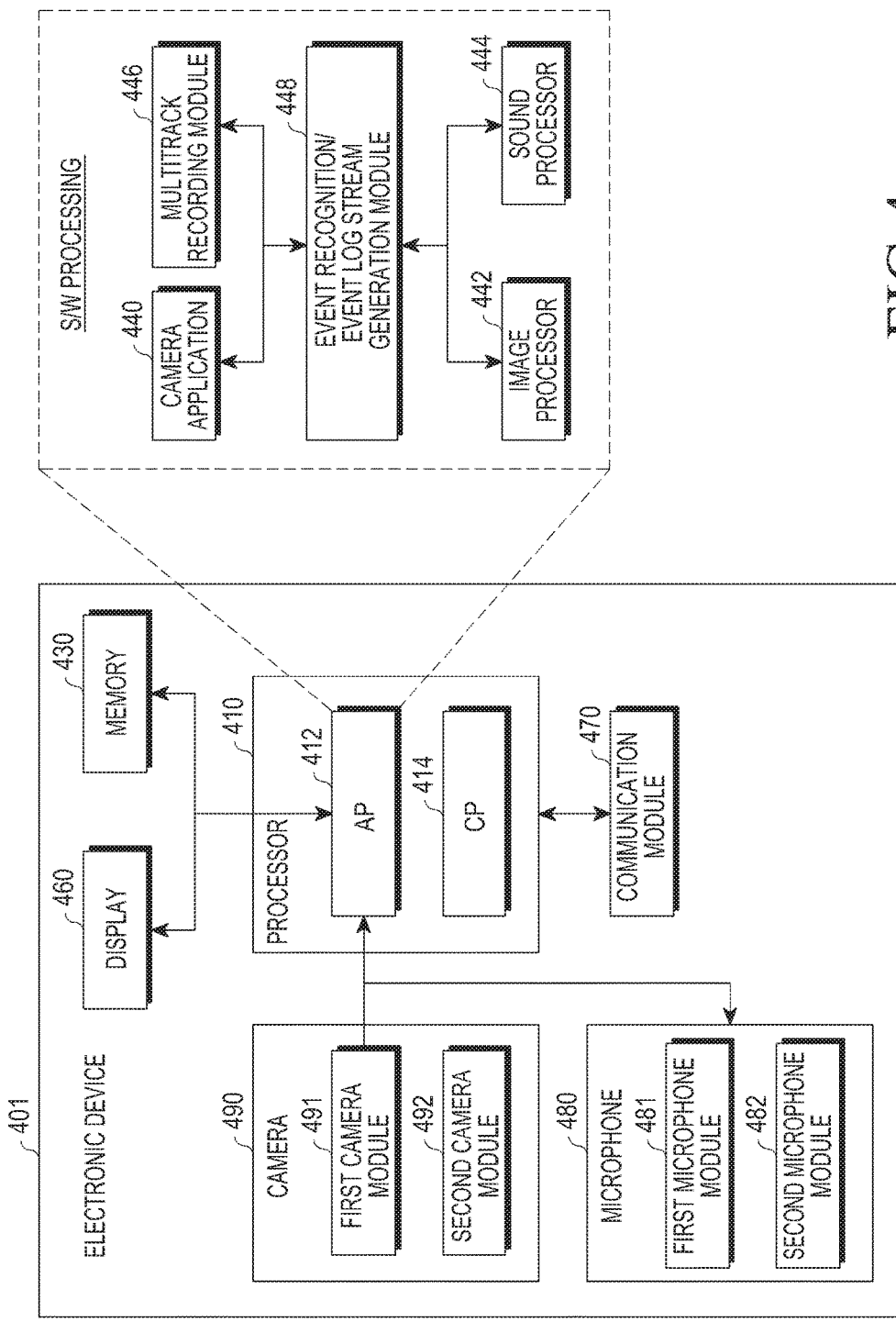
FIG. 4 illustrates main elements of a first electronic device for performing an image providing method according to various embodiments of the present disclosure.

FIG. 4 illustrates main elements of a first electronic device for performing an image providing method according to various embodiments.

The first electronic device 401 (for example, the electronic device 101 or 201) may include, for example, a first camera 490 (for example, the camera module 291), a first microphone 480 (for example, the microphone 288), a first memory 430 (for example, the memory 130 or 230), a first display 460 (for example, the display 160 or 260), a first communication module 470 (for example, the communication interface 170 or the communication module 220), and a first processor 410 (for example, the processor 120 or 210).

The first camera 490 may photograph subject(s) in front of and/or in the rear of the first electronic device 401 and output image(s) of the photographed subject(s). For example, the front of the first electronic device 401 may correspond to a direction that the first display 460 faces and the rear may correspond to a direction opposite to that of the front. The first camera 490 may include a first camera module 491 (or a rear surface/or rear camera module) for photographing a subject in the rear of the first electronic device 401 and a second camera module 492 (or a front surface/front camera module) for photographing a subject in front of the first electronic device 401.

For example, each of the camera modules 491 and 492 may photograph a still image or a dynamic image according to a control of the first processor 410 and may output the photographed still image or dynamic image to the first processor 410 or the first memory 430. The first processor 410 may store the photographed still image or dynamic image in the first memory 430 or display the photographed still image or dynamic image on the first display 460.

For example, the camera modules 491 and 492 may generate a preview image (or a live preview image) for the front or rear subject and may output the generated preview image to the first processor 410 or the first display 460. The processor 410 may display the preview image on the first display 460. For example, the first processor 410 may display the image stored in the first memory 430 on the first display 460.

The first display 460 may display an image, a signal, data, or information input from the first camera 490, the first memory 430, or the first processor 410 on a screen.

The first microphone 480 may detect a sound, such as a voice, and output the sound data to the first processor 410. The first microphone 480 may include a plurality of microphone modules, for example, a first microphone module 491 (or a rear surface/rear microphone module) oriented toward the rear and a second microphone module 492 (or a front surface/front microphone module) oriented toward the front of the first electronic device 401.

The first memory 430 may store an image, a sound, a signal, data, or information input from the first processor 410. The first memory 430 may store a multitrack file (or referred to as a multitrack video file) and a plurality of images and sound data which are included or may be included in the multitrack file. For example, each of the first image, the second image, and/or the multitrack file may be video file(s) having image information/data and sound information/data (or audio information) such as voices. For example, the video file may have at least one expansion of mpeg, mpg, mp4, avi, mov, and mkv.

For example, the sound data may be recorded together with the image when the first image or the second image is photographed. For example, the sound file may have at least one expansion of mp3, wma, ogg, and way.

According to an embodiment, the first memory 430 may store target data (or a database) for recognizing a preset subject (or an entirety or a part of the person, an entirety or a part of the object (including nature such as cloud, sky, sea, or the like)) or a scene in the image. The target data for recognizing the subject may include a subject image or information on a feature point (or referred to as a feature image or a feature pattern) of the subject image. The feature point may be an edge, a corner, an image pattern, or a contour line. The first memory 430 may further include target data for recognizing a preset word or a registered voice of the user in the sound.

According to an embodiment, the target data may store data or information on composition/layout of subjects. Such composition information may include information on a plurality of subjects, and information on each subject may include information on a subject type (or name), a subject location, a size, a direction, a scene category, or the like.

The subject type information may be a person, plant, animal, food, building, street, geographic feature, and nature (for example, at least one of sea, river, lake, and sky)

The subject location information may include a location of a representative point (for example, a central point) of the subject or locations of corner points defining the subject. The location may be expressed by coordinates or a ratio (for example, a point corresponding to ⅓ of the entire width from the left end of the image or a point corresponding to ⅓ of the entire length from the upper end of the image).

The subject size information may be expressed by a constant value, coordinates (coordinates of corner points), or a ratio (for example, a point corresponding to ⅓ of the entire width from the left end of the image or a point corresponding to ⅓ of the entire length from the upper end of the image).

The subject direction information may indicate a pose, an azimuth, or a direction of the subject, and may correspond to, for example, information on a direction (for example, frontward, leftward, rightward, upward, or downward) in which the subject is oriented. The subject direction information may be expressed by one of five directions including a frontward direction, a leftward direction, a rightward direction, an upward direction, and a downward direction, or may be expressed by one of nine directions including a frontward direction, a leftward direction, a rightward direction, an upward direction, a downward direction, a left-upward direction, a left-downward direction, a right-upward direction, and a right-downward direction, or may be expressed by coordinates in a two dimensional or a three dimensional Cartesian coordinate system.

The scene category may indicate a category/type (for example, at least one of a city crossroad, in front of crosswalk, beach, riverside, and roads/sidewalks in front of/next to a building) of the entire scene expressed by the whole input image.

According to an embodiment, the processor 410 may recognize information included in the image and/or the sound based on the target data.

The processor 410 may recognize a subject registered in the target data in the input image through an algorithm such as scale invariant feature transform (SIFT) or speeded up robust features (SURF) and may apply a template-based matching method to the recognized subject, so as to estimate a pose.

The processor 410 may recognize the subject registered in the target data in the input image and estimate the pose of the subject based on 2D or 3D subject information stored in the target data.

The processor 410 may recognize an image area that matches the subject registered in the target data in the input image. Further, the processor 410 may recognize the subject without reference to the target data according to the type of a target to be recognized, and, for example, may detect edge feature points and corner feature points in the input image and recognize a flat subject, such as a quadrangle, a circle, or a polygon limited by the edge features and the corner features.

The processor 410 may search for scene category information that matches the composition/layout of the subjects recognized in the target data. The processor 410 may detect a corresponding scene category based on types, locations, and/or directions of the subjects.

The processor 410 may recognize situation information such as a target to be photographed, a photographing location or place based on at least one of information on the recognized subjects (for example, types, locations, and/or directions of the recognized subjects), scene category information of the recognized subjects and location information (for example, location information through the GNSS module 227 or the GPS module) of the electronic device 401.

According to an embodiment, the processor 410 may transmit an image, a sound, and/or information related to the image or sound to an external electronic device (for example, the first external electronic device 102, the second external electronic device 104, or the server 106), and may receive recognized information on the image or sound from the external electronic device.

The first processor 410 may display a first image in a first area of the first display 460 (or a first screen area or a first area of a video application (hereinafter, referred to as a video reproduction/recording/camera application)). The first processor 410 may display a second image in a second area of the first display 460 (or a second screen area or a second area of a video application). The first processor 410 may store or share a multitrack file including the first image and the second image.

According to an embodiment, the first processor 410 may receive at least one image (and sound data) to be included in the multitrack file from the external electronic device (for example, the external electronic device 102 or 104, or the server 106) through the first communication module 470.

According to an embodiment, the first processor 410 may transmit the multitrack file to the external electronic device through the first communication module 470.

The first processor 410 may include an application processor (AP) 412 and a communication processor (CP) 414. The application processor 412 may include software processing modules such as a camera application 440 (or a video application), an image processor 442, a sound processor 444, a multitrack recording module 446, and an event recognition/event log stream generation module 448.

The camera application 440 (or the video application) may control/drive the first camera 490 to generate an image through camera firmware.

The image processor 442 may digitize/encode (or compress/encrypt) or decode (or decompress/decrypt) at least one image through at least one codec. For example, the image processor 442 may digitize/encode (for example, MP4) first and/second images (for example, YUV format) acquired through the first camera 490 or the first communication module 470 and store the digitized/encoded image in a buffer. For example, the buffer may be provided within the image processor 442, the first processor 410, or the first memory 430, or may be separately provided.

According to an embodiment, the acquiring of the image and the digitizing/encoding of the image through the first camera 490 or the first communication module 470 may be performed in real time, that is, at least partially simultaneously.

The sound processor 444 may digitize/encode (or compress/encrypt) or decode (or decompress/decrypt) at least one sound data through at least one codec. For example, the sound processor 444 may digitize/encode (for example, advanced audio coding (AAC)) sound data (for example, pulse-code modulation (PCM) format) acquired through the first microphone 480 or the first communication module 470 and store the digitized/encoded sound data in a buffer. For example, the buffer may be provided within the sound processor 444, the first processor 410, or the first memory 430, or may be separately provided.

According to an embodiment, the acquiring of the sound data and the digitizing/encoding of the sound data through the first microphone 480 or the first communication module 470 may be performed in real time, that is, at least partially simultaneously.

The multitrack recording module 446 may perform synchronization between the digitized/encoded images or between the digitized/encoded image and the digitized/encoded sound data. The multitrack recording module 446 may multiplex/encode (for example, MP4) the digitized/encoded image and the digitized/encoded sound data to generate a multitrack file. For example, the multitrack recording module 446 may multiplex/encode (for example, MP4) digitized/encoded image streams and the digitized/encoded sound data input from a plurality of camera modules to generate one file including multitrack streams.

According to an embodiment, the first processor 410 may further include a multiplexing module for multiplexing/encoding (for example, MP4) the digitized/encoded image and the digitized/encoded sound data to generate a multitrack file.

According to an embodiment, the acquiring of the image/sound data, the digitizing/encoding of the image/sound data, and the generating of the multitrack file may be performed in real time, that is, at least partially simultaneously.

The event recognition/event log stream generation module 448 may generate event information (or event marker/log) or an event log stream including a plurality of pieces of event information through analysis of the scene/subject of the digitized/encoded image and/or audio analysis of the digitized/encoded sound data, and the generated event information or event log stream may be inserted/multiplexed into the multitrack file by the multitrack recording module 446. For example, the event information (or event marker/log) may include at least one of event type/identification information, event explanation, and event generation time/interval information (for example, timestamp). For example, the analysis of the image/sound data may be performed before or after the encoding of the image/sound data.

According to an embodiment, the multitrack recording module 446 may generate the multitrack file and then insert the event information or the event log stream into the multitrack file, or may generate the multitrack file by digitizing/encoding (for example, MP4) the digitized/encoded image, the digitized/encoded sound data, and the event log stream.

According to an embodiment, the acquiring of the image/sound data and the generating of the event information (or image/audio analysis) may be performed in real time, that is, at least partially simultaneously.

According to an embodiment, the digitizing/encoding of the image/sound data and the generating of the event information (or image/audio analysis) may be performed in real time, that is, at least partially simultaneously.

According to an embodiment, the acquiring of the image/sound data, the digitizing/encoding of the image/sound data, the generating of the event information (or image/audio analysis), and the generating of the multitrack file may be performed in real time, that is, at least partially simultaneously.

According to an embodiment, the generating of the event information (or image/audio analysis) and the generating of the multitrack file may be performed in real time, that is, at least partially simultaneously.

Figure 5:
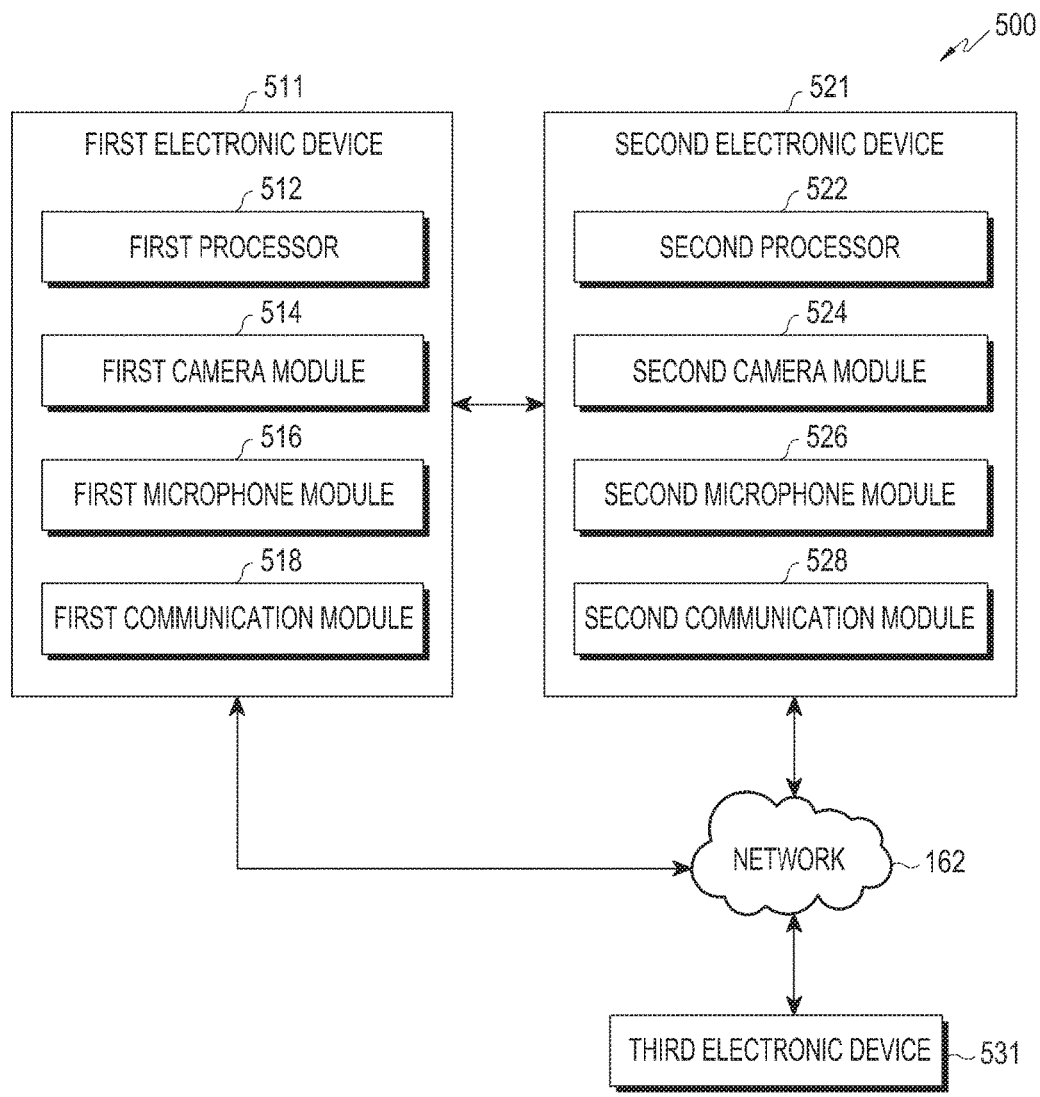
FIG. 5 illustrates a communication system according to various embodiments of the present disclosure.

FIG. 5 illustrates a communication system according to various embodiments. A communication system 500 may include a first electronic device 511 (for example, the electronic device 101, 201, or 401), a second electronic device 521 (for example, the electronic device 101 or 201), and a third electronic device 531 (for example, the electronic device 101 or 201).

The first electronic device 511 may include a first camera module 514 (for example, the camera module 291) for photographing/outputting an image, a first microphone module 516 (for example, the microphone 288) for recording/outputting sound data, a first communication module 518 (for example, the communication interface 170 or the communication module 220) for transmitting data to an external electronic device or receiving data from an external electronic device, and a first processor 512 (for example, the processor 120 or 210) that is functionally connected to the first camera module 514, the first microphone module 516, and/or the first communication module 518 and implements a function of the first electronic device 511 through a control of all/some of them.

The second electronic device 521 may include a second camera module 524 (for example, the camera module 291) for photographing/outputting an image, a second microphone module 526 (for example, the microphone 288) for recording/outputting sound data, a second communication module 528 (for example, the communication interface 170 or the communication module 220) for transmitting data to an external electronic device or receiving data from an external electronic device, and a second processor 522 (for example, the processor 120 or 210) that is functionally connected to the second camera module 524, the second microphone module 526, and/or the second communication module 528 and implements a function of the second electronic device 521 through a control of all/some of them.

The third electronic device 531 may have a configuration that is the same/similar to that of the first electronic device 511 or the second electronic device 521.

The first electronic device 511, the second electronic device 521, and the third electronic device 531 may be connected to each other directly or through the wired/wireless network 162, or may communicate with each other directly or through the wired/wireless network 162. For example, the first electronic device 511 and the second electronic device 521 may be directly connected to each other or communicate with each other directly. For example, the first electronic device 511 and/or the second electronic device 521 may be connected to the third electronic device 531 through the wired/wireless network 162 or communicate with the third electronic device 531 through the wired/wireless network 162.

According to an embodiment, the first electronic device 511 may acquire a first image through the first camera module 514 and acquire first sound data through the first microphone module 516. The second electronic device 521 may acquire a second image through the second camera module 524 and acquire second sound data through the second microphone module 526. The third electronic device 531 may acquire a third image through a third camera module (not shown) and acquire third sound data through a third microphone module (not shown).

According to an embodiment, the first electronic device 511 may receive at least one of the second and third images and at least one piece of the second and third sound data from at least one of the second electronic device 521 and the third electronic device 531 through the first communication module 518. The first electronic device 511 may generate a multitrack file including at least two of the first to third images and at least one piece of the first to third sound data.

According to an embodiment, the first electronic device 511 may receive a user input related to a control of the photographing of the second electronic device 521 and/or the third electronic device 531 and transmit photographing control information (for example, a photographing initiation/stop/termination command or a photographing initiation command according to a timer (or designation of a photographing initiation time) corresponding to the user input to the second electronic device 521 and/or the third electronic device 531. The second electronic device 521 and/or the third electronic device 531 may perform an operation according to the photographing control information or display the photographing control information on the corresponding display.

When the first electronic device 401 illustrated in FIG. 4 or the first electronic device 511 illustrated in FIG. 5 is referred to as the electronic device, the second electronic device 521 and the third electronic device 531 may be referred to as a first external electronic device and a second external electronic device, respectively.

According to various embodiments, the first processor 410 or 512 of the first electronic device 401 or 511 may be configured to perform an operation of acquiring first and second images and sound data; an operation of generating event information through analysis of at least one of the first and second images and the sound data; and an operation of generating a multitrack file including the first and second images, the sound data, and the event information.

According to various embodiments, the first processor 410 or 512 of the first electronic device 401 or 511 may be configured to further perform an operation of encoding each of the first and second images and the sound data.

According to various embodiments, the first processor 410 or 512 of the first electronic device 401 or 511 may be configured to perform an operation of displaying a first image (or the first image of the multitrack file) in a first area of the first display 460; an operation of, when a first condition is met, displaying a second image (or the second image of the multitrack file) in a second area of the first display 460; and an operation of, when a second condition is met, switching locations and/or sizes of the first and second images.

According to various embodiments, the first processor 410 or 512 may be configured to further perform an operation of generating a video file including the first image, the second image, sound data related to at least one of the first and second images, and event information related to at least one of the first and second images.

According to various embodiments, the event information related to at least one of the first and second images may include at least one of situation information indicating a situation/state of the first electronic device 401 or 511, a situation/state of the user, or a photographing situation/state/condition, information received from the second electronic device 521 and/or the third electronic device 531, user input information, search information using an external network, and event identification/type information (for example, a pleasant moment, surprising moment, or a funny moment).

According to an embodiment, the first and/or the second condition may include at least one of detection/generation of a preset event, detection/generation of an event defined in event identification/type information within the multitrack file, a case where a preset period arrives, a case where an attribute/characteristic value of the electronic device is larger than or equal to/equal to or smaller than a preset threshold value, a case where a recognition/attribute/characteristic value of the image/sound is larger than or equal to/equal to or smaller than a preset threshold value, a case where a user input is received, detection of context associated with the electronic device that matches preset context, and detection of at least one word that matches at least one preset word.

According to various embodiments, the first processor 410 or 512 may be configured to further perform an operation of comparing event information related to at least one of the first and second images with a preset condition (for example, larger than or equal to/equal to or smaller than a threshold value); and an operation of determining whether the first or second condition is met at least partially based on a result of the comparison.

According to various embodiments, the first condition includes detection of a first input, and the first processor 410 or 512 may be configured to further perform: an operation of displaying a first graphic element for detecting the first input; and an operation of detecting the first input for the first graphic element.

According to various embodiments, the second condition includes detection of a second input, and the first processor 410 or 512 may be configured to further perform an operation of displaying a second graphic element for detecting the second input; and an operation of detecting the second input for the second graphic element.

According to various embodiments, the first area may be larger than the second area.

According to various embodiments, the first image may be an image photographed by the first camera module 491 or 514, and the second image may be an image photographed by the second camera module 492 or 524.

According to various embodiments, the sound data may include first sound data recorded by the first microphone module 481 or 516 and second sound data recorded by the second microphone module 482 or 526.

According to various embodiments, the sound data may be sound data recorded by the first microphone module 481 or 516 and/or the second microphone module 482 or 526 while the first and/or second images are photographed by the first camera module 491 or 514 of the first electronic device 401 or 511 and/or the second camera module 492 or 524.

According to various embodiments, the first processor 410 or 512 may be configured to further perform a step of displaying a video application (or a video application screen) on the first display 460, and the first and second areas may correspond to areas of the video application.

According to various embodiments, when a preset time expires after the first condition is met, the first processor 410 or 512 may be configured to remove the second image from the screen.

According to various embodiments, when a preset time expires after the second condition is met, the first processor 410 or 512 may be configured to further perform an operation of switching locations and/or sizes of the first and second images.

According to various embodiments, the first and second images may be images including the same subject, and may have at least one of different sizes, resolutions, white balances, and brightnesses.

According to various embodiments, the first processor 410 or 512 may be configured to further perform an operation of receiving at least one of the first and second images from the second electronic device 521 and/or the third electronic device 531.

According to various embodiments, the first processor 410 or 512 may be configured to further perform an operation of acquiring situation information indicating a situation of the first electronic device 401 or 511, a situation of the user, or a photographing situation; and an operation of determining whether the first or second condition is met at least partially based on a result of a comparison between the situation information and a preset condition.

According to various embodiments, the first processor 410 or 512 may be configured to further perform: an operation of recognizing a scene or a subject of the first or second image; and an operation of determining whether the first or second condition is met at least partially based on a result of a comparison (for example, exactly matching or matching accuracy higher than or equal to a threshold value) between recognition information of the scene or the subject and a preset condition (for example, when a matching accuracy with information preset in the electronic device is larger than or equal to a threshold value).

According to various embodiments, the first processor 410 or 512 may be configured to further perform: an operation of acquiring the first and second images; an operation of acquiring event information related to at least one of the first and second images; and an operation of determining whether the first or the second condition is met at least partially based on the event information related to at least one of the first and second images.

According to various embodiments, the event information related to at least one of the first and second images may include situation information indicating a situation/state of the first electronic device 401 or 511, a situation/state of the user, or a photographing state/situation/condition. The situation information may include at least one of information on a motion/state of the first electronic device 401 or 511 or the user, information on a subject, information on a quality of the image, recognition information on a scene or a subject of the image, information on a recognized event/type of a scene or a subject of the image, state/facial expression/emotional information of the user, information on a current/photographing time/location, information on a location/place of the first electronic device 401 or 511, and surrounding sound information (for example, sound data and/or sound recognition/event information).

According to various embodiments, the first processor 410 or 512 may be configured to further perform: an operation of acquiring event information related to at least one of the first and second images; and an operation of generating a video file including the first image, the second image, and the event information related to at least one of the first and second images.

According to various embodiments, the first processor 410 or 512 may be configured to further perform: an operation of generating a video file including the first image, the second image, and the event information related to at least one of the first and second images; an operation of removing a part of the video file (for example, removing the second image, a part of the first image and/or the second image, or a part that is met a particular (photographing) condition in the first and/or the second images) based on at least one of information related to the second electronic device 521 or the third electronic device 531, event information related to at least one of the first and second images, and attributes of the video file or network attributes (for example, a network security level or a network speed) in response to a request for transmitting the video file by the second electronic device 521 or the third electronic device 531.

According to various embodiments, the first processor 410 or 512 may be configured to further perform: an operation of detecting a value indicating a motion of the first electronic device 401 or 511 or the subject; an operation of comparing the value indicating the motion of the first electronic device 401 or 511 or the subject with a preset condition (for example, larger than or equal to/equal to or smaller than a threshold value); and an operation of determining whether the first or second condition is met at least partially based on a result of the comparison.

According to various embodiments, the first processor 410 or 512 may be configured to further perform: an operation of acquiring event information related to at least one a plurality of images including the first and second images; and an operation of displaying a third image of the plurality of images in the first or second area to replace the first or second image at least partially based on the event information related to at least one of the plurality of images.

According to various embodiments, the first processor 410 or 512 may be configured to further perform: an operation of comparing the value indicating the motion of the subject within the first image and the value indicating the motion of the subject within the first image; and an operation of determining whether the first or the second condition is met at least partially based on a result of comparison.

According to various embodiments, the first processor 410 or 512 may be configured to further perform: an operation of comparing a volume of a sound recorded with the first or second image with a preset condition (for example, larger than or equal to/or equal to or smaller than a threshold value); and an operation of determining whether the first or second condition is met at least partially based on a result of the comparison.

According to various embodiments, the first processor 410 or 512 may be configured to further perform: an operation of comparing the value indicating the motion of the subject within the first or second image with a preset condition (for example, larger than or equal to/or equal to or smaller than a threshold value); and an operation of controlling a size/speed of the first or second image at least partially based on a result of the comparison.

According to various embodiments, the first processor 410 or 512 may be configured to further perform an operation of controlling a reproduction speed of the first or second image at least partially based on event information related to the first or second image.

According to various embodiments, the first processor 410 or 512 may be configured to further perform: an operation of comparing a volume of a sound related to the first or second image with a preset condition (for example, larger than or equal to/or equal to or smaller than a threshold value); an operation of, when the volume of the sound meets the preset condition, comparing the value indicating the motion of the subject within the first image and the value indicating the motion of the subject within the second image; and an operation of determining whether the first or second condition is met at least partially based on a result of comparison.

According to various embodiments, the first processor 410 or 512 may decrease the size, the speed (for example, a bit rate or a frame rate), the resolution of the first or second image or increase the reproduction speed of the first or second image under a condition in which the motion value of the subject within the first or second image is smaller than the preset threshold value.

According to various embodiments, the first processor 410 or 512 may decrease the reproduction speed of the first or second image under a condition in which the motion value of the subject within the first or second image is larger than or equal to the preset threshold value and/or a condition in which the volume of the sound is higher than or equal to the preset threshold value.

Figure 6A:
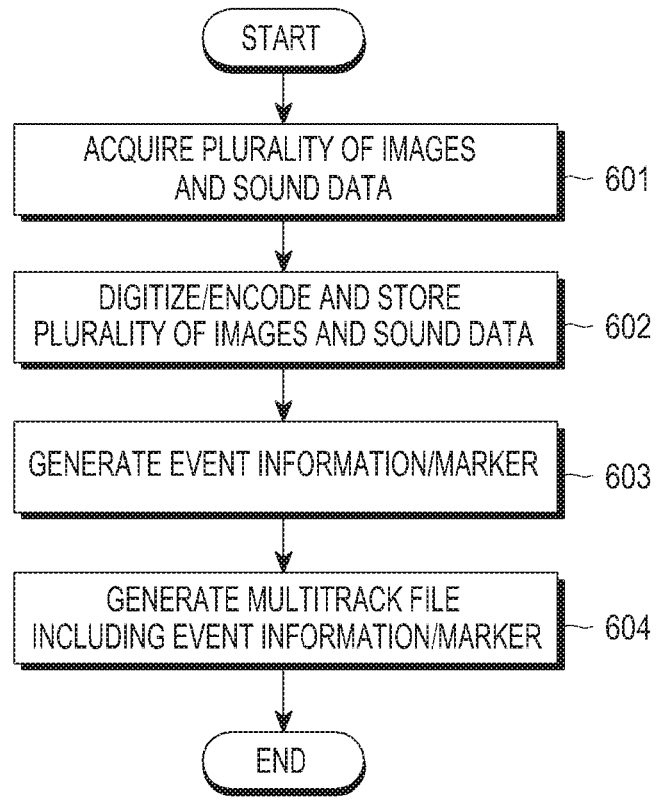
FIGS. 6A and 6B illustrates flowcharts for an image providing method of a first electronic device according to various embodiments of the present disclosure.

FIG. 6A is a flowchart illustrating an image providing method of a first electronic device according to various embodiments. The image providing method may include operations 601 to 604. The image providing method may be performed by at least one of the first electronic device (for example, the electronic device 101, 201, 401, or 511), the processor (for example, the processor 120, 210, 410, or 512) of the first electronic device, or the controller of the first electronic device.

In operation 601, the first electronic device may acquire a plurality of images and at least one piece of sound data.

According to an embodiment, the first electronic device may acquire a plurality of images through at least one camera module (for example, the camera module 291, 491, 492, or 514) or the camera 490) functionally connected to the first electronic device or the first communication module (for example, the communication interface 170 or the communication module 220) functionally connected to the first electronic device. The first electronic device may acquire at least one piece of sound data through at least one microphone module (for example, the microphone module 481, 482, or 516, or the microphone 288 or 480) functionally connected to the first electronic device or the first communication module (for example, the communication interface 170 or the communication module 220).

In operation 602, the first electronic device may digitize/encode the plurality of images and the sound data and store the digitized/encoded images and sound data.

According to an embodiment, the first electronic device may digitize and/or encode (or compress/encrypt) at least one image through at least one codec. The first electronic device may digitize and/or encode (or compress/encrypt) at least one piece of sound data through at least one codec.

According to an embodiment, when the first electronic device receives encoded images and encoded sound data through the first communication module, operation 602 may be omitted.

In operation 603, the first electronic device may generate at least one event information/marker for at least one digitized/encoded image and/or at least one digitized/encoded sound data.

According to an embodiment, the first electronic device may generate at least one piece of event information (or event marker/log) or an event log stream including a plurality of pieces of event information through analysis of the scene/subject of the digitized/encoded image and/or audio analysis of the digitized/encoded sound data. For example, the analysis of the image/sound data may be performed before or after the encoding of the image/sound data.

In operation 604, the first electronic device may generate a multitrack file including a plurality of digitized/encoded images (or image stream), at least one piece of digitized/encoded sound data, and at least one piece of event information/marker/log (or event log stream).

According to an embodiment, the first electronic device may generate the multitrack file and then insert the event information/marker/log or the event log stream into the multitrack file, or may generate the multitrack file by multiplexing/encoding (for example, MP4) the digitized/encoded image, the digitized/encoded sound data, and the event log stream.

Figure 6B:
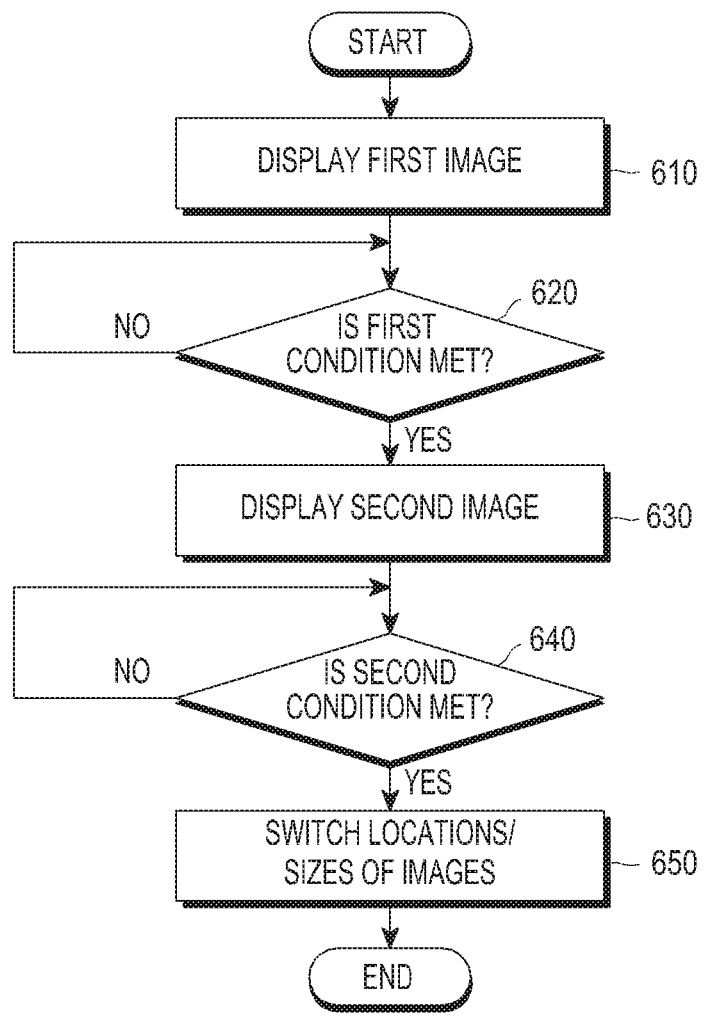

FIG. 6B is a flowchart illustrating an image providing method of a first electronic device according to various embodiments. The image providing method may include operations 610 to 650. The image providing method may be performed by at least one of the first electronic device (for example, the electronic device 101, 201, 401, or 511), the processor (for example, the processor 120, 210, 410, or 512) of the first electronic device, or the controller of the first electronic device.

In operation 610, the first electronic device may display a first image.

According to an embodiment, the first electronic device may acquire the first image for a subject through the first camera module (for example, the camera module 291, 491, 492, or 514, or the camera 490) functionally connected to the first electronic device.

According to an embodiment, the first electronic device may display the first image on the first display (for example, the display 160, 260, or 460) functionally connected to the first electronic device or in a first area (for example, a first screen area or a first area of a video application (hereinafter, referred to as a video reproduction/recording/camera application) of the first display in real time while the first original image or the first image is photographed.

According to an embodiment, the photographing of the first image may be automatically initiated according to the reception of a photographing command from the user or setting information stored in the first memory (for example, the memory 130, 230, or 430) functionally connected to the first electronic device.

According to an embodiment, the photographing of the first image may be automatically terminated according to reception of a photographing termination command from the user or setting information stored in the first memory. For example, the first electronic device may receive the photographing command and/or the photographing termination command through the input device (for example, the input device 250, the display 160, 260, or 460, the microphone 288 or 480, or the sensor module 240).

According to an embodiment, the first electronic device may generate or acquire the first image based on the first original image acquired through the first camera module. For example, the first electronic device may generate or acquire the first image from the first original image. For example, the first electronic device may generate or acquire the first image based on at least a part of the first original image (or at least some frames of the original image or at least a part of each image frame).

According to an embodiment, the first electronic device may receive the first original image or the first image from the external electronic device (for example, the electronic device 102, 104, 521, or 531, or the server 106) through the first communication module (for example, the communication interface 170 or the communication module 220) functionally connected to the first electronic device.

In operation 620, the first electronic device may determine whether the first condition is met.

The first electronic device may perform operation 630 when the first condition is met, and periodically or aperiodically perform operation 620 when the first condition is not met.

According to an embodiment, the first electronic device may compare event information related to at least one of the first and second images with a preset condition (for example, larger than or equal to/equal to or smaller than a threshold value) and determine whether the first condition is met at least partially based on a result of the comparison.

According to an embodiment, the event information related to at least one of the first and second images may include at least one of situation information indicating a situation/state of the electronic device, a situation/state of the user, or a photographing situation/state/condition, information received from the external electronic device, user input information, search information using an external network, and event identification/type information (for example, a pleasant moment, a surprising moment, or a funny moment).

In operation 630, the first electronic device may display the second image.

According to an embodiment, the first electronic device may acquire the second image for a subject through the second camera module (for example, the camera module 291, 491, 492, or 514, or the camera 490) functionally connected to the first electronic device.

According to an embodiment, the first electronic device may display the second image on the first display or a second area (or a second screen area or a second area of the video application) of the first display in real time while the second image is photographed.

According to an embodiment, the photographing of the second image may be automatically initiated according to the reception of a photographing command from the user or setting information stored in the memory functionally connected to the first electronic device.

According to an embodiment, the photographing of the second image may be automatically terminated according to reception of a photographing termination command from the user or setting information stored in the memory. For example, the first electronic device may receive the photographing command and/or the photographing termination command through the input device.

According to an embodiment, the first electronic device may generate or acquire the second image based on the second original image acquired through the second camera module. For example, the first electronic device may generate or acquire the second image from the second original image. For example, the first electronic device may generate or acquire the second image based on at least a part of the second original image (or at least some image frames of the second original image or at least a part of each image frame).

According to an embodiment, the first electronic device may receive the second original image or the second image from the external electronic device (for example, the electronic device 102, 104, 521, or 531, or the server 106) through the first communication module.

In operation 640, the first electronic device may determine whether the second condition is met.

The first electronic device may perform operation 650 when the second condition is met, and periodically or aperiodically perform operation 640 when the second condition is not met.

According to an embodiment, the first electronic device may compare event information related to at least one of the first and second images with a preset condition (for example, larger than or equal to/equal to or smaller than a threshold value) and determine whether the second condition is met at least partially based on a result of the comparison.

In operation 650, the first electronic device may switch a location/size of the first image and a location/size of the second image. For example, when the second condition is met, the first electronic device may display the first image in the first area of the first display and the second image in the second area of the first display. When the second condition is met, the first electronic device may display the first image in the second area and the second image in the first area.

For example, the first and/or second images may be preview images of the subject acquired through the camera module functionally connected to the first electronic device or images periodically/successively photographed/recorded according to period/time interval information stored in the first memory functionally connected to the first electronic device. The preview image may have a resolution (or smaller number of pixels) and/or a size smaller than that of the photographed/recorded image. The photographed/recorded image may be deleted by the user, or may be permanently stored in the first memory until the first memory is damaged due to a mechanical error. The preview image may be temporarily stored to be displayed on the first display and then automatically deleted without being permanently stored in the first memory.

According to an embodiment, the photographed/recorded image may be transmitted periodically/aperiodically or stored in an external server such as a cloud server or a web hard server by the first electronic device (when a new image is photographed/recorded by the first electronic device). Alternatively, the first electronic device may receive the image periodically/aperiodically photographed/recorded by the external electronic device (for example, the electronic device 102, 104, 521, or 531, or the server 106) from an external server such as a cloud server or a web hard server (when a new photographed/recorded image is stored in the external server).

According to an embodiment, the first and/or the second condition may include at least one of detection/generation of a preset event, detection/generation of an event defined in event identification/type information within the multitrack file, a case where a preset period arrives, a case where an attribute/characteristic value of the electronic device is larger than or equal to/equal to or smaller than a preset threshold value, a case where a recognition/attribute/characteristic value of the image/sound is larger than or equal to/equal to or smaller than a preset threshold value, a case where a user input is received, detection of context associated with the electronic device that matches preset context, and detection of at least one word that matches at least one preset word.

According to an embodiment, the preset situation of the electronic device may include at least one of a case where the electronic device is located or arrives at a preset area/place, a case where a preset time arrives, a case where the electronic device operates according to a preset operation pattern (for example, execution of application(s)), and a case where a current state of the electronic device (for example, at least one of a battery state, a wireless signal reception state, and a memory state) matches a preset state.

According to an embodiment, the preset situation of the electronic device may be determined based on use history information of the electronic device (for example, a history of the electronic device having executed a function/service related to a multitrack file in a particular place).

According to various embodiments, a method of providing an image by an electronic device may include: an operation of acquiring first and second images and sound data; an operation of generating event information through analysis of at least one of the first and second images and the sound data; and an operation of generating a multitrack file including the first and second images, the sound data, and the event information.

According to various embodiments, the method may further include an operation of encoding each of the first and second images and the sound data.

According to various embodiments, the method of providing the image by the electronic device may include: an operation of displaying a first image (or a first image of the multitrack file) in a first area of a display; an operation of displaying a second image (or a second image of the multitrack file) in a second area of the display when a first condition is met; and an operation of switching locations or sizes of the first and second images when a second condition is met.

According to various embodiments, the method may further include an operation of generating a video file including the first image, the second image, sound data related to at least one of the first and second images, and event information related to at least one of the first and second images.

According to various embodiments, the event information related to at least one of the first and second images may include at least one piece of situation information indicating a situation/state of the electronic device, a situation/state of the user, or a photographing situation/state/condition, information received from an external electronic device, user input information, search information using an external network, and event identification/type information.

According to various embodiments, the method may further include: an operation of comparing the event information related to at least one of the first and second images with a preset condition (for example, larger than or equal to/equal to or smaller than a threshold value); and an operation of determining whether the first or second condition is met at least partially based on a result of the comparison.

According to various embodiments, the first condition may include detection of a first input, and the method may further include: an operation of displaying a first graphic element for detecting the first input; and an operation of detecting the first input for the first graphic element.

According to various embodiments, the second condition includes detection of a second input, and the method may further include: an operation of displaying a second graphic element for detecting the second input; and an operation of detecting the second input for the second graphic element.

According to various embodiments, the first area may be larger than the second area.

According to various embodiments, the first image may be an image photographed by a first camera module, and the second image may be an image photographed by a second camera module.

According to various embodiments, the sound data may be sound data recorded while the first image and/or the second image is photographed.

According to various embodiments, the sound data may be sound data recorded by a microphone of the electronic device while the first and/or the second image are photographed by the first and/or second cameras of the electronic device.

According to various embodiments, the method may further include a step of displaying a video reproduction/recording/camera application, and the first and second areas may correspond to areas of the video/reproduction/recording/camera application.

According to various embodiments, the method may further include an operation of removing the second image from the screen when a preset time expires after the first condition is met.

According to various embodiments, the method may further include an operation of switching locations and/or sizes of the first and second images when a preset time expires after the second condition is met.

According to various embodiments, the first and second images may be images including the same subject, and may have at least one of different sizes, resolutions, white balances, and brightnesses.

According to various embodiments, the method may further include an operation of receiving at least one of the first and second images from at least one external electronic device.

According to various embodiments, the method may further include: an operation of acquiring situation information indicating a situation of the electronic device, a situation of the user, or a photographing situation; and an operation of determining whether the first or second condition is met at least partially based on a result of the comparison between the situation information and a preset condition.

According to various embodiments, the method may further include: an operation of recognizing a scene or a subject of the first or second image; and an operation of determining whether the first or second condition is met at least partially based on a result of the comparison (for example, exactly matching or matching accuracy higher than or equal to a threshold value) between information on the recognized scene or subject with a preset condition (for example, matching accuracy with information preset in the electronic device is larger than or equal to a threshold value).

According to various embodiments, the method may further include: an operation of acquiring the first and second images; an operation of identifying event information related to at least one of the first and second images; and an operation of determining whether the first or second condition is met at least partially based on event information related to at least one of the first and second images.

According to various embodiments, the event information related to at least one of the first and second images may include situation information indicating a situation/state of the electronic device, a situation/state of the user, or a photographing state/situation/condition, and the situation information may include at least one piece of information on a motion/state of the electronic device or the user, information on a subject, information on a quality of the image, recognition information of the scene or the subject of the image, recognized event/type information of the scene or the subject of the image, state/facial expression/emotional information of the user, information on a current/photographing time/location, information on a location/place of the electronic device, and surrounding sound information (for example, sound data and/or sound recognition/event information).

According to various embodiments, the method may further include: an operation of acquiring event information related to at least one of the first and second images; and an operation of generating a video file including the first image, the second image, and event information related to at least one of the first and second images.

According to various embodiments, the method may further include: an operation of generating the video file including the first image, the second image, and the event information related to at least one of the first and second images; an operation of removing a part of the video file based on at least one of information related to an external electronic device, information related to at least one of the first and second images, attributes of the video file, and network attributes (for example, network security level or network speed) in response to a request for transmitting the video file by the external electronic device; and an operation of transmitting the video file from which the part has been removed to the external electronic device.

According to various embodiments, the method may further include: an operation of detecting a value indicating a motion of the electronic device or the subject; an operation of comparing the value indicating the motion of the electronic device or the subject with a preset condition (for example, larger than or equal to/equal to or smaller than a threshold value); and an operation of determining whether the first or second condition is met at least partially based on a result of the comparison.

According to various embodiments, the method may further include: an operation of acquiring event information related to at least one of a plurality of images including the first and second images; and an operation of displaying a third image of the plurality of images in the first area to replace the first image at least partially based on the event information related to at least one of the plurality of images.

According to various embodiments, the method may further include: an operation of comparing the value indicating the motion of the subject within the first image and the value indicating the motion of the subject within the first image; and an operation of determining whether the first or second condition is met at least partially based on a result of the comparison.

According to various embodiments, the method may further include: an operation of comparing a volume of a sound with a preset condition (for example, larger than or equal to/equal to or smaller than a threshold value); and an operation of determining whether the first or second condition is met at least partially based on a result of comparison.

According to various embodiments, the method may further include: an operation of comparing the value indicating the motion of the subject within the first or second image with a preset condition (for example, larger than or equal to/equal to or smaller than a threshold value); and an operation of controlling the size/speed of the first or second image at least partially based on a result of the comparison.

According to various embodiments, the method may further include an operation of controlling a reproduction speed of the second image at least partially based on event information related to the second image.

According to various embodiments, the method may further include: an operation of comparing a volume of a sound related to the first or second image with a preset first condition (for example, larger than or equal to/equal to or smaller than a threshold value); an operation of comparing the value indicating the motion of the subject within the first image and the value indicating the motion of the subject with the second image when the volume of the sound meets the preset first condition; and an operation of determining whether the first or second condition is met at least partially based on a result of the comparison.

FIGS. 7A to 7E illustrate an image providing method of a first electronic device according to various embodiments.

Figure 7A:
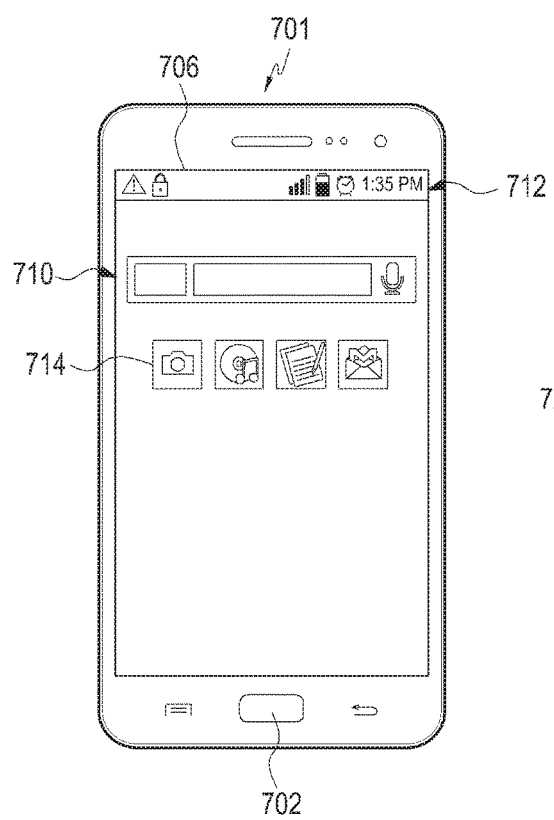
FIGS. 7A, 7B, 7C, 7D and 7E illustrate an image providing method of a first electronic device according to various embodiments of the present disclosure.

Referring to FIG. 7A, a first memory (for example, the memory 130, 230, or 430) functionally connected to a first electronic device 701 (for example, the electronic device 101, 201, 401, or 511) may store a voice recognition application or a video application (hereinafter, referred to as a video reproduction/recording/camera application). The first electronic device 701 may display a screen 710 (for example, a home screen) including executable icons mapped to applications on a first display 706 (for example, the display 160, 260, or 460) functionally connected to the first electronic device 701.

The first electronic device 701 may display a status bar 712 together with the screen 710.

The status bar 712 may include at least one of an indicator indicating a battery charging state, an indicator indicating a strength of a received signal, and a current time indicator.

According to an embodiment, the first electronic device 701 may detect an input that requires execution of the video application through an input device (for example, the input device 250, the display 160, 260, or 460, the microphone 288 or 480, or the sensor module 240) functionally connected to the first electronic device 701. The input may be one of various types of information that are input into the first electronic device 701 such as a gesture, a voice, or a biometric signal of the user. For example, the first electronic device 701 may detect an input (or selection) for an icon 714 of the multitrack file. The first electronic device 701 may execute the video application in response to the input.

According to an embodiment, the first electronic device 701 may detect an input for a predetermined button or key included in the input device on a predetermined screen such as an application screen, a lock screen, or a home screen. The first electronic device 701 may execute the video application in response to the input. For example, one or more buttons may be formed on the front surface, the side surface, or the rear surface of the first electronic device 701, and the button(s) may include at least one of a power button, volume buttons (for example, a volume up button and a volume down button), a menu button, a home button/key 702, a back button, a search button, and a multitask button. For example, the first electronic device 701 may detect an input (or selection) (for example, a double click or a long click/press) for the home button 702 (or home key).

Figure 7B:
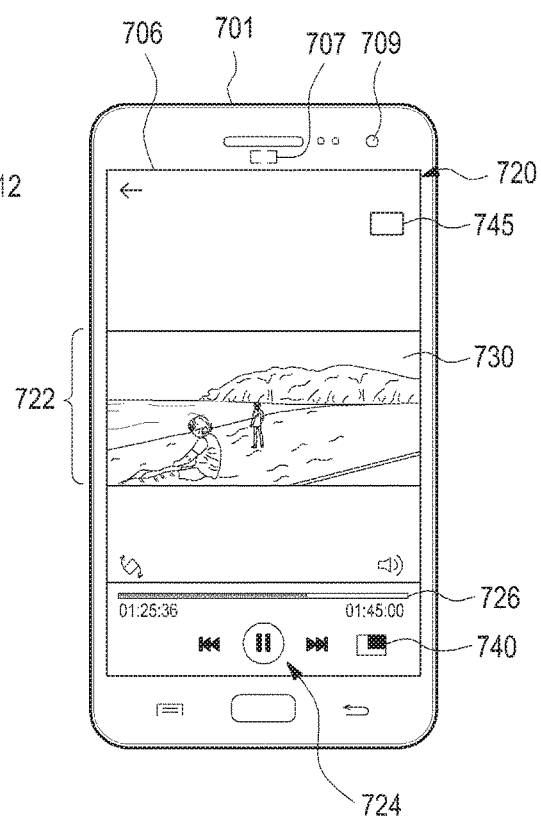

Referring to FIG. 7B, as the video application is executed, a video application screen 720 (or a video application window) may be displayed on the display 706.

The video application screen 720 may include, for example, a main view area 722 corresponding to an area for displaying a main image, a plurality of buttons 724 for controlling an image, and a progress bar 726 for displaying how much the image is reproduced. For example, a first image 730 having a first size that is acquired through a first camera module 707 disposed on the rear surface of the first electronic device 701 to photograph a subject in the rear of the first electronic device 701 or included the multitrack file may be displayed in the main view area 722. For example, the plurality of button(s) 724 may include a rewind button, a pause/play button, and a forward button. The video application screen 720 may further include a first graphic element 740 for switching/changing a dual/single view and a second graphic element 745 for switching locations or sizes of images.

The first electronic device 701 may detect a second input for selecting the second graphic element 745 through the input device.

Figures 7C, 7D:
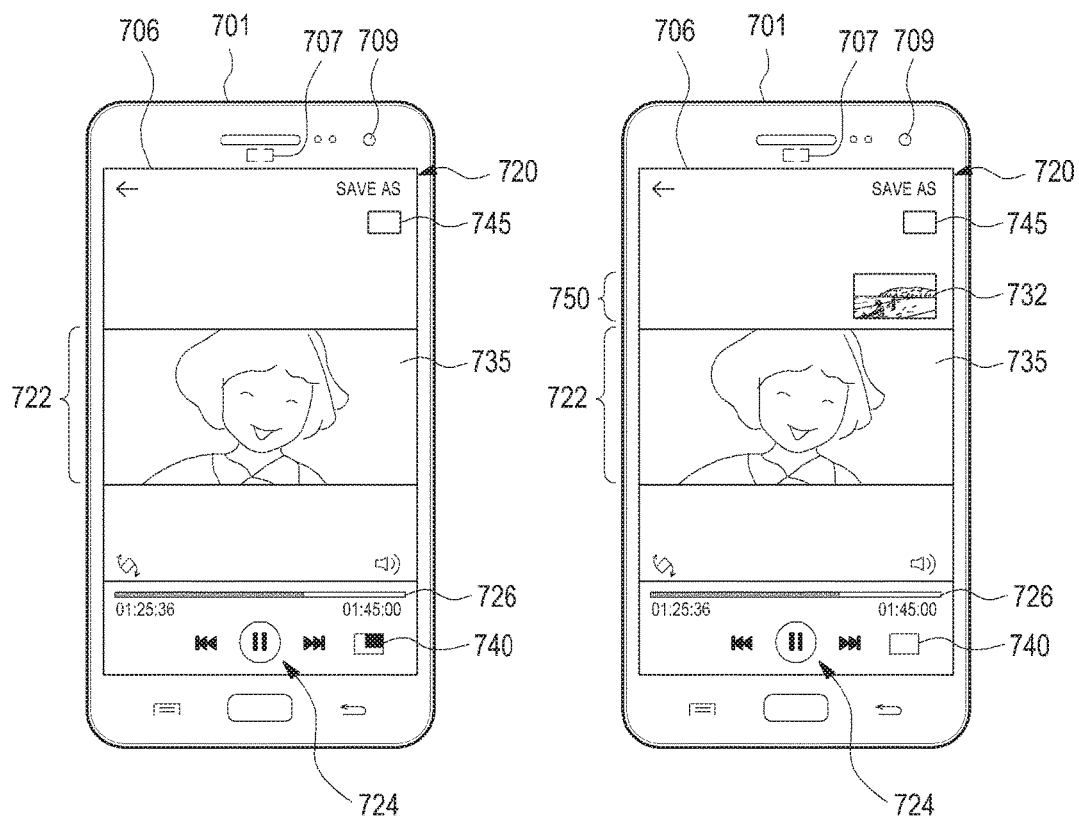

Referring to FIG. 7C, in response to the second input for selecting the second graphic element 745, the first electronic device 701 may display, instead of the first image 730, a second image 735 having a first size that is acquired through a second camera module 709 disposed on the front surface of the first electronic device 701 to photograph a subject in front of the first electronic device 701 or included in the multitrack file in the main view area 722.

The first electronic device 701 may detect a first input for selecting the first graphic element 740 through the input device.

Referring to FIG. 7D, in response to the first input for selecting the first graphic element 740, the first electronic device 701 may display a first image 732 having a second size smaller than the first size in a sub view area 750 in a state where the second image 735 is displayed in the main view area 722.

The first electronic device 701 may detect the second input for selecting the second graphic element 745 through the input device.

Figure 7E:
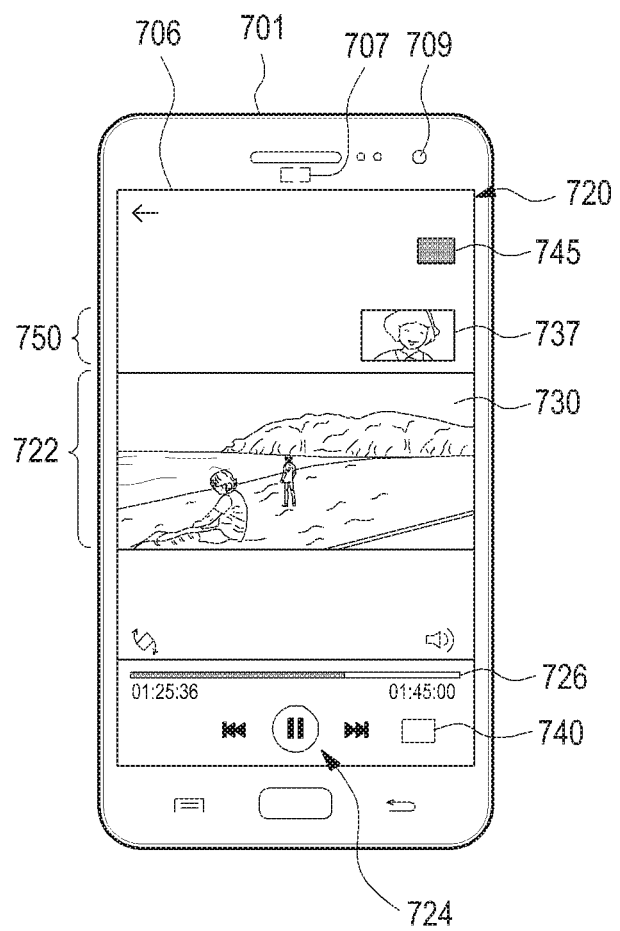

Referring to FIG. 7E, in response to the second input for selecting the second graphic element 745, the first electronic device 701 may display the first image 730 having the first size in the main view area 722 and display the second image 737 having the second size in the sub view area 750.

In response to the second input for selecting the second graphic element 745, the first electronic device 701 may switch locations or sizes of the first image 730 and the second image 735. For example, in response to the second input for selecting the second graphic element 745 again, the first electronic device 701 may display the second image 735 having the first size in the main view area 722 and display the first image 732 having the second size in the sub view area 750.

In response to the first input for selecting the first graphic element 740, the first electronic device 701 may or may not display the image in the sub view area 750. For example, in response to the first input for selecting the first graphic element 740 again, the first electronic device 701 may remove a second image 737 having the second size displayed in the sub view area 750 from the video application screen 720.

Figure 8:
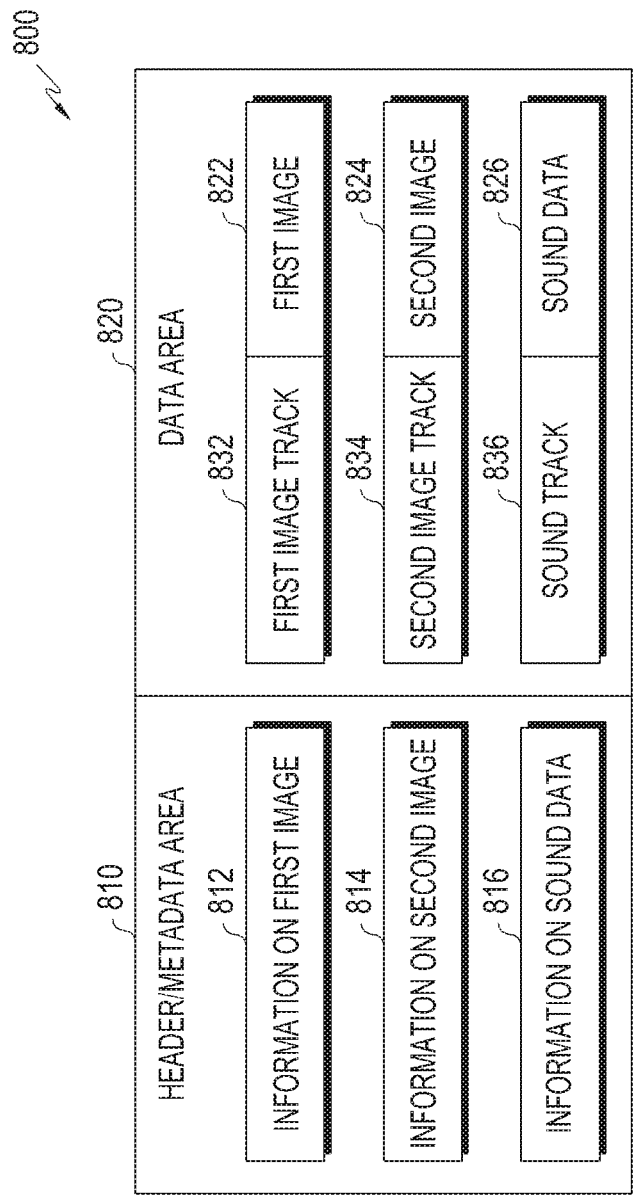
FIG. 8 illustrates a format of a multitrack file according to various embodiments of the present disclosure.

FIG. 8 illustrates a format of a multitrack file according to various embodiments.

A multitrack file 800 may include a data area 820 including data, and a header/metadata area 810 including information on data.

The data area 820 may include a plurality of image tracks and at least one voice track. For example, the data area 820 may include a first image track 832 including a first image 822, a second image track 834 including a second image 824, and a sound track 836 including sound data 826.

The header/metadata area 810 may include a plurality of pieces of header information or a plurality of pieces of metadata. For example, the header/metadata area 810 may include information 812 on the first image 822, information 814 on the second image 824, and information 816 on the sound data 826.

According to an embodiment, the sound data 826 may be recorded together with the image when the first image 822 and/or the second image 824 are photographed, and the sound data 826 may be synchronized with the first image 822 and/or the second image 824.

According to an embodiment, at least one piece of the information 812 on the first image 822 and the information 814 on the second image 824 may include at least one piece of situation information indicating a situation/state of the electronic device, a situation/state of the user, or a photographing situation/state/condition, information received from an external electronic device, user input information, search information using an external network, and event identification/type information.

According to an embodiment, the information 812 on the first image 822 may include information on the number/capacity/size of all frames of the first image 822, information on a storage address/frame rate/bit rate/image size of the first image 822, synchronization information for supporting a reproduction function of the first image 822, and/or compression/encoding/encryption information (or decompression/decoding/decryption information) of the second image 824.

According to an embodiment, the information 814 on the second image 824 may include information on the number/capacity/size of all frames of the second image 824, information on a storage address/frame rate/bit rate/image size of the second image 824, synchronization information for supporting a reproduction function of the second image 824, and/or compression/encoding/encryption information (or decompression/decoding/decryption information) of the second image 824.

According to an embodiment, the information 816 on the sound data 826 may include information on total capacity/size of the sound data 826, information on a storage address/bit rate of the sound data 826, synchronization information for supporting a reproduction function of the sound data 826, and/or compression/encoding/encryption information (or decompression/decoding/decryption information) of the sound data 826.

According to an embodiment, at least one piece of the information 812 on the first image 822, the information 814 on the second image 824, and the information 816 on the sound data 826 may include event information, and the event information may include at least one of event type/identification information, event explanation, and event occurrence time/interval information (for example, timestamp).

According to an embodiment, the information 812 on the first image 822, the information 814 on the second image 824, and the information 816 on the sound data 826 may be included in a track header of the first image track 832, a track header of the second image track 834, and a track header of the sound track 836 within the data area 820, respectively.

Figure 9:
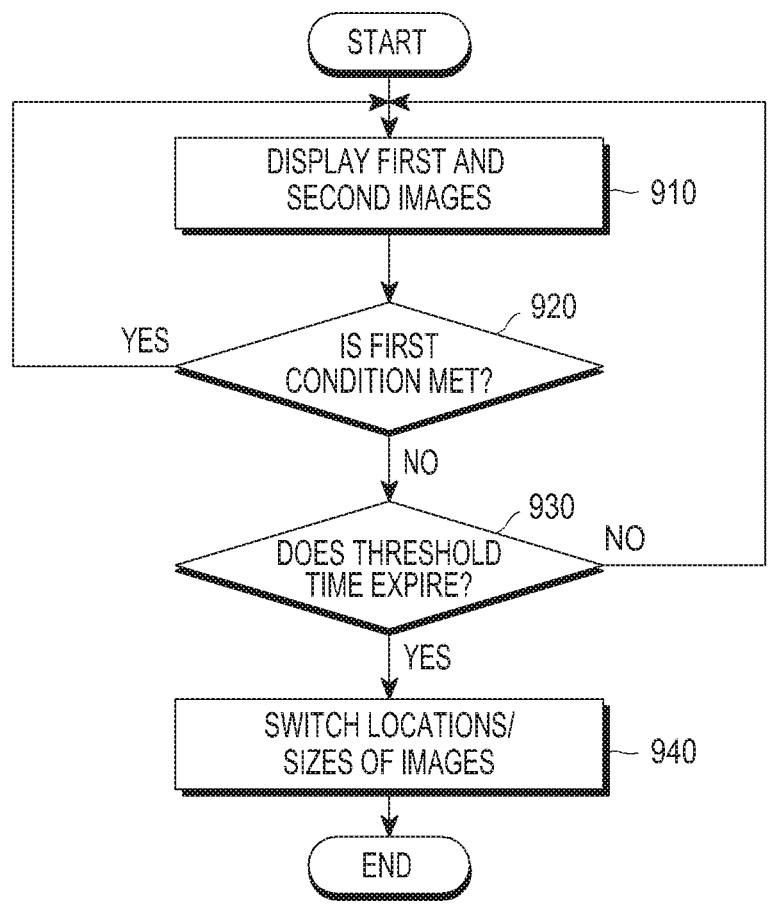
FIG. 9 illustrates a flowchart for an image providing method of a first electronic device according to various embodiments of the present disclosure.

FIG. 9 is a flowchart illustrating an image providing method of a first electronic device according to various embodiments. The image providing method may include operations 910 to 940. The image providing method may be performed by at least one of the first electronic device (for example, the electronic device 101, 201, 401, or 511), the processor (for example, the processor 120, 210, 410, or 512) of the first electronic device, or the controller of the first electronic device.

In operation 910, the first electronic device may display first and second images on a first display (for example, the display 160, 260, or 460) functionally connected to the first electronic device.

According to an embodiment, when starting reproducing a multitrack file through a video application, the first electronic device may automatically display a first image and a second image within the multitrack file according to a user input or automatic settings.

In operation 920, the first electronic device may determine whether the first condition is met.

The first electronic device may perform operation 930 when the first condition is not met, and continuously perform operation 910 when the first condition is met.

According to an embodiment, the first electronic device may compare event information related to at least one of the first and second images with a preset condition (for example, larger than or equal to/equal to or smaller than a threshold value) and determine whether the first condition is met at least partially based on a result of the comparison.

According to an embodiment, event information related to at least one of the first and second images may include at least one piece of situation information indicating a situation/state of the first electronic device, a situation/state of the user, or a photographing situation/state/condition, information received from an external electronic device, user input information, search information using an external network, and event identification/type information.

According to an embodiment, the first condition may include at least one of detection/generation of a preset event, detection/generation of an event defined in event identification/type information within the multitrack file, a case where a preset period arrives, a case where an attribute/characteristic value of the electronic device is larger than or equal to/equal to or smaller than a preset threshold value, a case where a recognition/attribute/characteristic value of the image/sound is larger than or equal to/equal to or smaller than a preset threshold value, a case where a user input is received, detection of context associated with the electronic device that matches preset context, and detection of at least one word that matches at least one preset word.

According to an embodiment, the preset situation of the electronic device may include at least one of a case where the electronic device is located or arrives at a preset area/place, a case where a preset time arrives, a case where the electronic device operates according to a preset operation pattern (for example, execution of application(s)), and a case where a current state of the electronic device (for example, at least one of a battery state, a wireless signal reception state, and a memory state) matches a preset state.

According to an embodiment, the preset situation of the electronic device may be determined based on use history information of the electronic device (for example, a history of the electronic device having executed a function/service related to a multitrack file in a particular place).

In operation 930, the first electronic device may determine whether a threshold time expires. For example, the first electronic device may count a preset threshold time from a time point when the first condition is not met (or from a time point when the first image and/or the second image is initially displayed or a time point when the last user input is made). The first electronic device may perform operation 940 when the threshold time expires, and may continuously perform operation 910 when the threshold time does not expire.

When the threshold time expires, the first electronic device may remove one of the first and second images from the screen of the first display in operation 940. That is, the first electronic device may display only one of the first and second images.

Figure 10A:
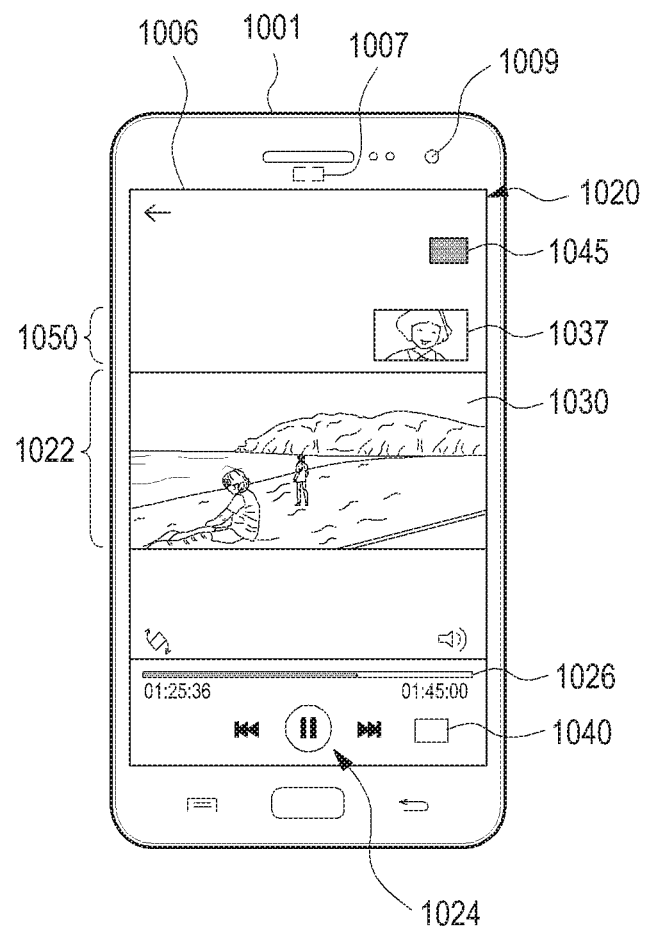
FIGS. 10A and 10B illustrate an image providing method of a first electronic device according to various embodiments of the present disclosure.
Figure 10B:
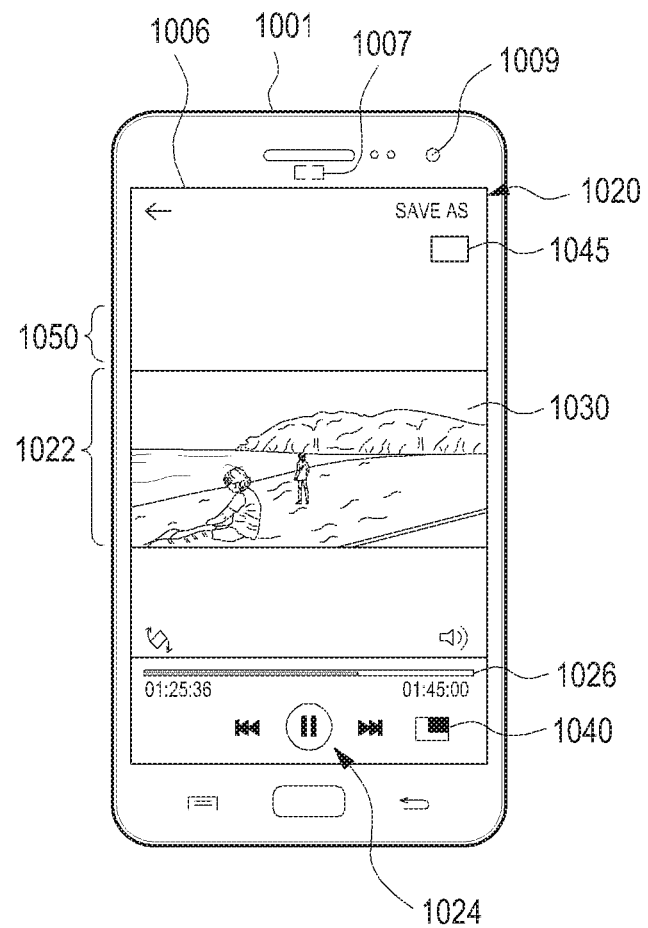

FIGS. 10A and 10B illustrate an image providing method of a first electronic device according to various embodiments.

Referring to FIG. 10A, a first memory (for example, the memory 130, 230, or 430) functionally connected to a first electronic device 1001 (for example, the electronic device 101, 201, 401, or 511) may store a voice recognition application or a video application (hereinafter, referred to as a video reproduction/recording/camera application). The first electronic device 1001 may execute a video application in response to an input that requires execution of the video application. The first electronic device 1001 may display a video application screen 1020 on a first display 1006 (for example, the display 160, 260, or 460) functionally connected to the first electronic device 1001.

The video application screen 1020 may include, for example, a main view area 1022 corresponding to an area for displaying a main image, a sub view area 1050 corresponding to an area for displaying a sub image, a plurality of buttons 1024 for controlling an image, a progress bar 1026 for displaying how much the image is reproduced, a first graphic element 1040 for switching/changing a dual/single view, and a second graphic element 1045 for switching locations or sizes of the images. For example, a first image 1030 having a first size that is acquired through a first camera module 1007 disposed on the rear surface of the first electronic device 1001 to photograph a subject in the rear of the first electronic device 1001 or included a multitrack file may be displayed in the main view area 1022. A second image 1037 that is acquired through a second camera module 1009 disposed on the front surface of the first electronic device 1001 to photograph a subject in front of the first electronic device 1001 or included in the multitrack file may be displayed in a second size in the sub view area 1050.

The electronic device 1001 may continuously display the first image 1030 and the second image 1037 when a first condition is met.

According to an embodiment, the first condition may include at least one of detection/generation of a preset event, detection/generation of an event defined in event identification/type information within the multitrack file, a case where a preset period arrives, a case where an attribute/characteristic value of the electronic device is larger than or equal to/equal to or smaller than a preset threshold value, a case where a recognition/attribute/characteristic value of the image/sound is larger than or equal to/equal to or smaller than a preset threshold value, a case where a user input is received, detection of context associated with the electronic device that matches preset context, and detection of at least one word that matches at least one preset word.

Referring to FIG. 10B, the first electronic device 1001 may remove the second image 1037 from the video application screen 1020 when a threshold time expires. For example, the first electronic device 1001 may count the threshold time from a time point when the first condition is not met (or from a time point when the first image and/or the second image is initially displayed).

According to an embodiment, the first electronic device 1001 may periodically determine whether the first condition is met or may detect the generation of an event. When the first condition is met or the event is generated, the first electronic device 1001 may display the screen as illustrated in FIG. 7C, 7D, or 10A. That is, when the first condition is met or the event is generated, the first electronic device 1001 may display the second image having the first size in the main view area 1022, display the first image having the second size in the sub view area 1050 while displaying the second image having the first size in the main view area 1022, or display the second image 1037 having the second size in the sub view area 1050.

Figure 11:
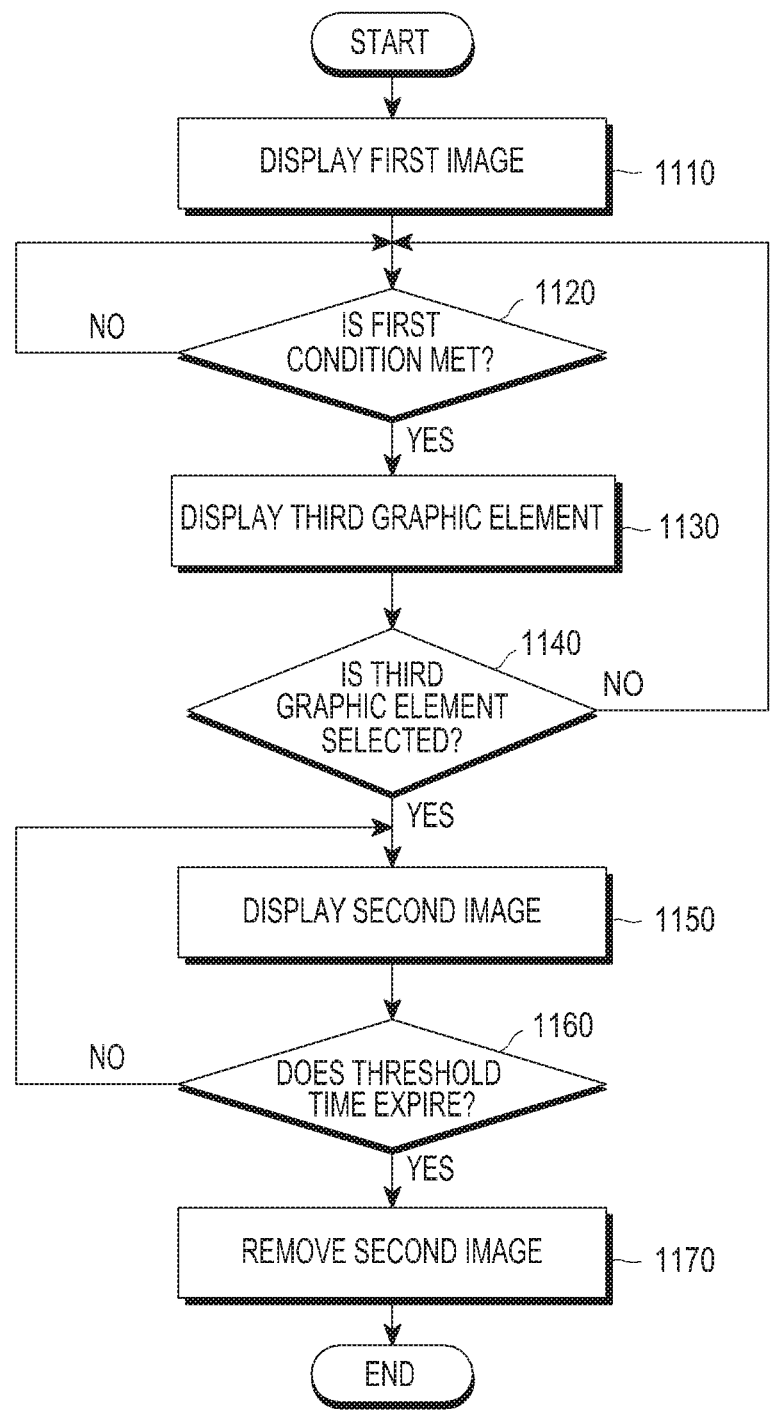
FIG. 11 illustrates a flowchart for an image providing method of a first electronic device according to various embodiments of the present disclosure.

FIG. 11 is a flowchart illustrating an image providing method of a first electronic device according to various embodiments. The image providing method may include operations 1110 to 1170. The image providing method may be performed by at least one of the first electronic device (for example, the electronic device 101, 201, 401, or 511), the processor (for example, the processor 120, 210, 410, or 512) of the first electronic device, or the controller of the first electronic device.

In operation 1110, the first electronic device may display a first image on a first display (for example, the display 160, 260, or 460) functionally connected to the first electronic device.

According to an embodiment, when starting reproducing a multitrack file through a video application, the first electronic device may automatically display a first image within the multitrack file according to a user input or automatic settings.

In operation 1120, the first electronic device may determine whether the first condition is met.

The first electronic device may perform operation 1130 when the first condition is met, and periodically or aperiodically perform operation 1120 when the first condition is not met.

According to an embodiment, the first condition may include at least one of detection/generation of a preset event, detection/generation of an event defined in event identification/type information within the multitrack file, a case where a preset period arrives, a case where an attribute/characteristic value of the electronic device is larger than or equal to/equal to or smaller than a preset threshold value, a case where a recognition/attribute/characteristic value of the image/sound is larger than or equal to/equal to or smaller than a preset threshold value, a case where a user input is received, detection of context associated with the electronic device that matches preset context, and detection of at least one word that matches at least one preset word.

In operation 1130, the first electronic device may display a third graphic element for switching/changing a dual/single view.

In operation 1140, the first electronic device may determine whether the third graphic element is selected. For example, the electronic device may detect an input for selecting the third graphic element through an input device (for example, the input device 250, the display 160, 260, or 460, the microphone 288 or 480, or the sensor module 240) functionally connected to the electronic device.

The first electronic device may perform operation 1150 when the third graphic element is selected, and may perform operation 1120 when the third graphic element is not selected. For example, when the first condition is not met after the electronic device returns to operation 1120 from operation 1140, the third graphic element may be removed from the screen of the first display.

In operation 1150, the first electronic device may display a second image within the multitrack file on the first display. For example, the first electronic device may display the second image together with the first image or display the second image instead of the first image.

In operation 1160, the first electronic device may determine whether a threshold time expires. For example, the first electronic device may count a preset threshold time from a time point when the first condition is not met (or from a time point when the second image is initially displayed or a time point when the last user input is made). The first electronic device may perform operation 1170 when the threshold time expires, and may continuously perform operation 1150 when the threshold time does not expire.

When the threshold time expires, the first electronic device may remove the second image from the screen of the first display in operation 1170. That is, the first electronic device may display only the first image between the first and second images.

Figure 12A:
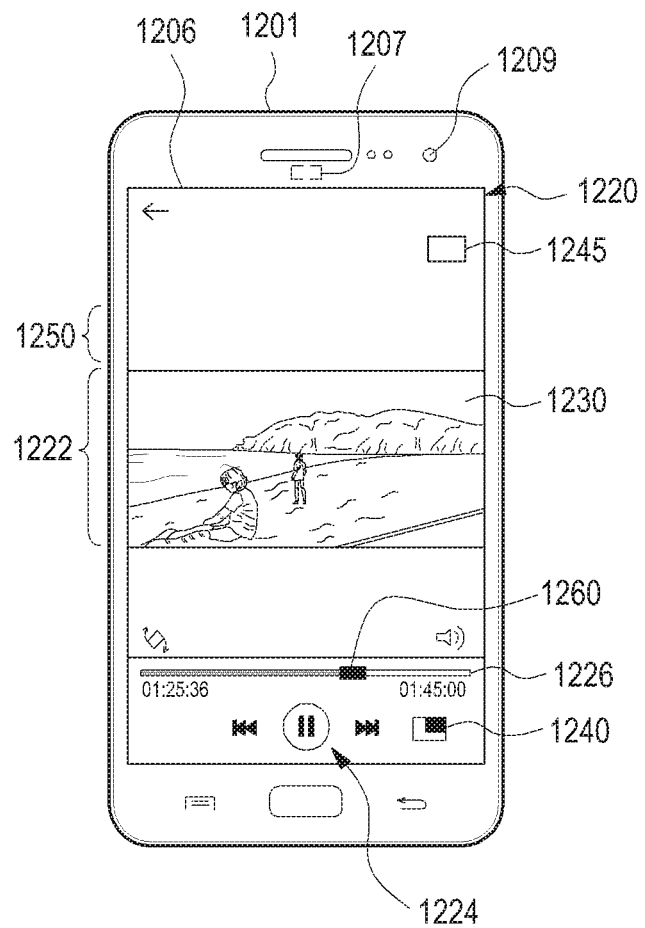
FIGS. 12A and 12B illustrate an image providing method of a first electronic device according to various embodiments of the present disclosure.
Figure 12B:
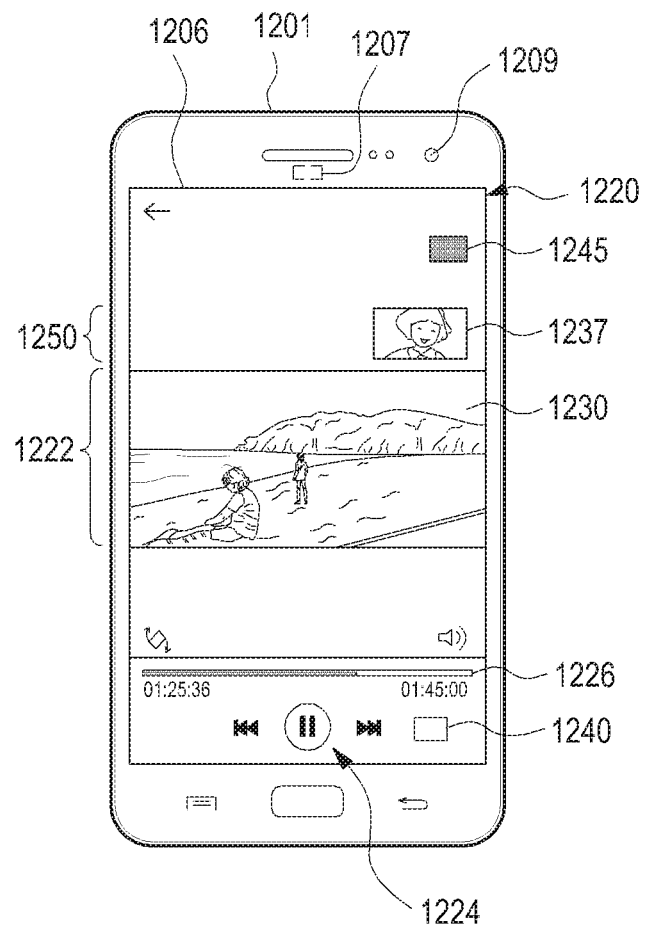

FIGS. 12A and 12B illustrate an image providing method of a first electronic device according to various embodiments.

Referring to FIG. 12A, a first memory (for example, the memory 130, 230, or 430) functionally connected to a first electronic device 1201 (for example, the electronic device 101, 201, 401, or 511) may store a voice recognition application or a video application (hereinafter, referred to as a video reproduction/recording/camera application). The electronic device 1201 may execute a video application in response to an input that requires execution of the video application.

A video application screen 1220 may include, for example, a main view area 1222 corresponding to an area for displaying a main image, a sub view area 1250 corresponding to an area for displaying a sub image, a plurality of buttons 1226 for controlling an image, a progress bar 1224 for displaying how much the image is reproduced, a first graphic element 1240 for switching/changing a dual/single view, and a second graphic element 1245 for switching locations or sizes of the images. For example, a first image 1230 having a first size that is acquired through a first camera module 1207 disposed on the rear surface of the first electronic device 1201 to photograph a subject in the rear of the first electronic device 1201 or included a multitrack file may be displayed in the main view area 1222.

According to an embodiment, the first electronic device 1201 may periodically determine whether the first condition is met or may detect the generation of an event. When the first condition is met or the event is generated, the first electronic device 1001 may display a third graphic element 1260 indicating the generation of the event.

According to an embodiment, the first condition may include at least one of detection/generation of a preset event, detection/generation of an event defined in event identification/type information within the multitrack file, a case where a preset period arrives, a case where an attribute/characteristic value of the electronic device is larger than or equal to/equal to or smaller than a preset threshold value, a case where a recognition/attribute/characteristic value of the image/sound is larger than or equal to/equal to or smaller than a preset threshold value, a case where a user input is received, detection of context associated with the electronic device that matches preset context, and detection of at least one word that matches at least one preset word.

Referring to FIG. 12B, the first electronic device 1201 may display a second image within the multitrack file on the first display 1206 in response to selection of the third graphic element 1260. For example, the first electronic device 1201 may display a second image 1237 having a second size together with the first image or display the second image having the first size instead of the first image 1230. For example, the first electronic device 1201 may display the first image 1230 having the first size in the main view area 1222, and display the second image 1237 having the second size that is acquired through a second camera module 1209 disposed on the front surface of the first electronic device 1201 to photograph a subject in front of the first electronic device 1201 or included in the multitrack file in the sub view area 1250.

According to an embodiment, when the first condition is not met or the event is not generated, the first electronic device 1201 may deactivate (or activate) at least one of the first graphic element 1240 and the second graphic element 1245.

According to an embodiment, when the first condition is met or the event is generated, the first electronic device 1201 may activate (or deactivate) at least one of the first graphic element 1240 and the second graphic element 1245. For example, the first electronic device 1201 may display a second image 1237 instead of the third graphic element in response to selection of the first graphic element 1240 or the second graphic element 1245 that has switched from the deactivated state to the activated state.

According to an embodiment, the third graphic element may be a visual effect (flickering, a change in a color/brightness, or highlight) applied to the first graphic element 1240 or the second graphic element 1245.

According to an embodiment, the first electronic device 1201 may count a preset threshold time from a time point when the first condition is not met (or form a time point when the third graphic element is initially displayed or a time point when the last user input is made). When the first condition is not met or the threshold time expires, the first electronic device 1201 may remove the third graphic element 1260 from a screen 1220 of the first display 1206.

Figure 13:
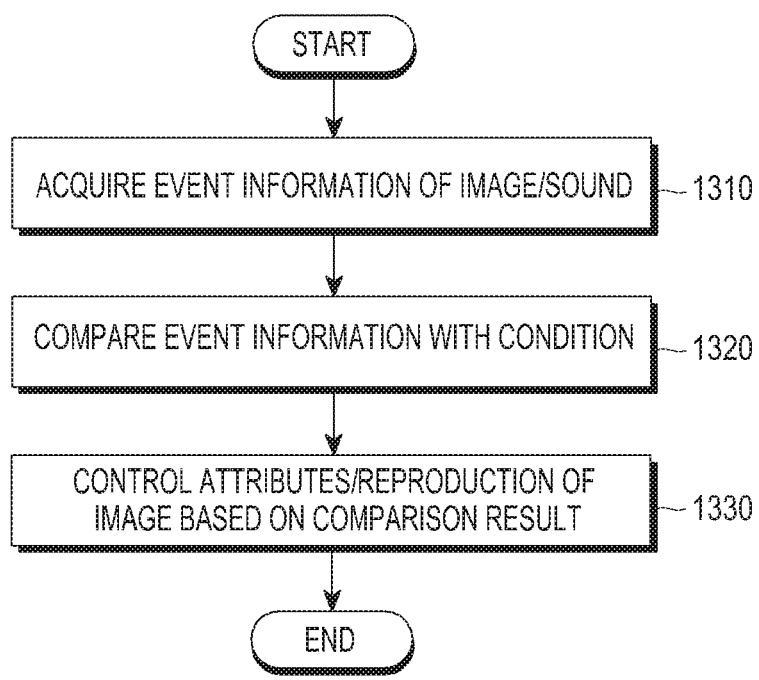
FIG. 13 illustrates a flowchart for an image providing method of a first electronic device according to various embodiments of the present disclosure.

FIG. 13 is a flowchart illustrating an image providing method of a first electronic device according to various embodiments. The image providing method may include operations 1310 to 1330. The image providing method may be performed by at least one of the first electronic device (for example, the electronic device 101, 201, 401, or 511), the processor (for example, the processor 120, 210, 410, or 512) of the first electronic device, or the controller of the first electronic device.

In operation 1310, the first electronic device may acquire event information of an image/sound.

According to an embodiment, the first electronic device may recognize information on a subject within the image (for example, a motion value, a scene type, whether the subject is a registered subject) from the image, recognize information on a sound (for example, a volume, whether the sound corresponds to a registered word or whether the sound corresponding to a voice of a registered user), or recognize event information of the multitrack file.

In operation 1320, the first electronic device may compare the event information with a preset condition (for example, larger than or equal to/equal to or smaller than a threshold value).

According to an embodiment, the first electronic device may compare the motion value of the subject within the image with a preset first threshold value.

According to an embodiment, the first electronic device may compare the volume of the sound with a preset second threshold value.

In operation 1330, the first electronic device may control attributes or reproduction of the image at least partially based on a result of the comparison.

According to an embodiment, when the motion value of the subject within the second image is larger than or equal to a preset threshold value, the first electronic device may determine that the first condition is met in operation 620 of FIG. 6B, operation 920 of FIG. 9, or operation 1120 of FIG. 11 or the second condition is met in operation 650 of FIG. 6B.

According to an embodiment, when the volume of the sound is higher than or equal to a preset threshold value, the first electronic device may determine that the first condition is met in operation 620 of FIG. 6B, operation 920 of FIG. 9, or operation 1120 of FIG. 11 or the second condition is met in operation 650 of FIG. 6B.

According to an embodiment, when the motion value of the subject within the second image is larger than or equal to the preset threshold value and the volume of the sound is higher than or equal to the preset threshold value, the first electronic device may determine that the first condition is met in operation 620 of FIG. 6B, operation 920 of FIG. 9, or operation 1120 of FIG. 11 or the second condition is met in operation 650 of FIG. 6B.

According to an embodiment, when the motion value of the subject within the second image is larger than the motion value of the subject within the first image and the volume of the sound is higher than or equal to the preset threshold value, the first electronic device may determine that the first condition is met in operation 620 of FIG. 6B, operation 920 of FIG. 9, or operation 1120 of FIG. 11, or the second condition is met in operation 650 of FIG. 6B.

According to an embodiment, under a condition that the motion value of the subject within the first or second image is smaller than a preset threshold value, the first electronic device may decrease the size, speed (for example, bit rate or frame rate), or resolution of the first or second image, or increase a reproduction speed of the first or second image.

According to an embodiment, under a condition that the motion value of the subject within the first or second image is larger than or equal to a preset threshold value and/or a condition that the volume of the sound is higher than or equal to a preset threshold value, the first electronic device may decrease the reproduction speed of the first or second image.

According to various embodiments, it is possible to conveniently generate a video file including a plurality of images through the generation of the multitrack file including event information and image switching based on the event and to also effectively provide an important image of the plurality of images to the user.

The term "module" as used herein may include a unit consisting of hardware, software, or firmware, and may, for example, be used interchangeably with the term "logic," "logical block," "component," "circuit," or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction that is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code that is made by a compiler or a code that may be executed by an interpreter.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium storing instructions are provided. The instructions may be configured to cause, when executed by at least one processor, the processor to perform at least one operation. The at least one operation may include: an operation of displaying a first image in a first area of a display; an operation of displaying a second image in a second area of the display when a first condition is met; and an operation of switching locations or sizes of the first and second images when a second condition is met.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing an image by an electronic device, the method comprising:
   acquiring a first image using a first camera module or a communication module;
   acquiring second image using a second camera module or the communication module;
   acquiring sound data;
   generating event information related to at least one of the first image, the second image and the sound data; and
   generating a multitrack file including the first image, second image, the sound data, and the event information.

2. The method of claim 1, further comprising encoding each of the first and second images and the sound data, wherein at least some of the acquiring of the first and second images and the sound data, the generating of the event information, and the generating of the multitrack file are simultaneously performed.

3. The method of claim 1, further comprising:
   displaying the first image in a first area of a display;
   displaying the second image in a second area of the display when a first condition is met; and
   switching locations or sizes of the first and second images when a second condition is met.

4. The method of claim 3, wherein the first condition includes detection of a first input, the method further comprising:
   displaying a first graphic element for detecting the first input; and
   detecting the first input for the first graphic element.

5. The method of claim 3, wherein the second condition includes detection of a second input, the method further comprising:
   displaying a second graphic element for detecting the second input; and
   detecting the second input for the second graphic element.

6. A non-transitory computer-readable storage medium storing instructions executable by at least one processor to perform at least one operation, the at least one operation comprising:
   acquiring first images using a first camera module or a communication module;
   acquiring second image using a second camera module or the communication module;
   acquiring sound data;
   generating event information of related to at least one of the first image, the second image and the sound data; and generating a multitrack file including the first image, second image, the sound data, and the event information.

7. The storage medium of claim 6, wherein:
the at least one operation further comprises encoding each of the first and second images and the sound data, and
at least some of: the acquiring of the first and second images and the sound data, the generating of the event information, and the generating of the multitrack file are simultaneously performed.

8. The storage medium of claim 6, wherein the at least one operation further comprises:
displaying the first image in a first area of a display;
displaying the second image in a second area of the display when a first condition is met; and
switching locations or sizes of the first and second images when a second condition is met.

9. The storage medium of claim 8, wherein the first condition includes detection of a first input, and the at least one operation further comprises:
displaying a first graphic element for detecting the first input; and
detecting the first input for the first graphic element.

10. The storage medium of claim 8, wherein the second condition includes detection of a second input, and the at least one operation further comprises:
displaying a second graphic element for detecting the second input; and
detecting the second input for the second graphic element.

11. An electronic device comprising:
a memory; and
a processor configured to:
acquire a first image using a first camera module or a communication module,
acquire second image using a second camera module or the communication module,
acquire sound data,
generate event information related to at least one of the first image, the second image and the sound data,
generate a multitrack file including the first image, second image, the sound data, and the event information, and
store the generated multitrack file in the memory.

12. The electronic device of claim 11, wherein:
the processor is further configured to encode each of the first and second images and the sound data, and
at least some of: the acquiring of the first and second images and the sound data, the generating of the event information, and the generating of the multitrack file are simultaneously performed.

13. The electronic device of claim 11, wherein the processor is further configured to:
display the first image in a first area of a display,
display the second image in a second area of the display when a first condition is met, and to switch locations or sizes of the first and second images when a second condition is met.

14. The electronic device of claim 13, wherein the processor is further configured to compare event information related to at least one of the first and second images with a preset condition and to determine whether the first or second condition is met at least partially based on a result of the comparison.

15. The electronic device of claim 13, wherein the first condition includes detection of a first input, and the processor is configured to display a first graphic element for detecting the first input and to detect the first input for the first graphic element.

16. The electronic device of claim 13, wherein the second condition includes detection of a second input, and the processor is configured to display a second graphic element for detecting the second input and to detect the second input for the second graphic element.

17. The electronic device of claim 13, wherein the processor is further configured to remove the second image from a screen when a preset time expires after the first condition is met.

18. The electronic device of claim 13, wherein the processor is further configured to switch locations or sizes of the first and second images when a preset time expires after the second condition is met.

19. The electronic device of claim 13, wherein the processor is further configured to:
detect a value indicating a motion of the electronic device or a subject within the first or second image,
compare the value indicating the motion of the electronic device or the subject with a preset threshold value, and
determine whether the first or second condition is met at least partially based on a result of the comparison.

20. The electronic device of claim 13, wherein the processor is configured to:
compare a volume of the sound data recorded together with the first or second image with a preset threshold value; and
determine whether the first or second condition is met at least partially based on a result of the comparison.

21. The method of claim 1, wherein the event information is at least one of situation information indicating a situation/state of the electronic device, a situation/state of a user, a photographing situation/state/condition, information received from an external electronic device, user input information, search information using an external network.

* * * * *